(12) United States Patent
Medina

(10) Patent No.: US 12,248,891 B2
(45) Date of Patent: *Mar. 11, 2025

(54) DISPATCH SYSTEM AND METHOD OF DISPATCHING VEHICLES

(71) Applicant: MOVEO TECHNOLOGIES CORPORATION, Coral Gables, FL (US)

(72) Inventor: Mario A. Medina, Coral Gables, FL (US)

(73) Assignee: MOVEO TECHNOLOGIES CORPORATION, Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,596

(22) Filed: Jul. 25, 2024

(65) Prior Publication Data

US 2024/0378513 A1 Nov. 14, 2024

Related U.S. Application Data

(63) Continuation of application No. 17/502,545, filed on Oct. 15, 2021, now Pat. No. 12,073,338, which is a
(Continued)

(51) Int. Cl.
| | |
|---|---|
| *G06Q 10/02* | (2012.01) |
| *G01C 21/34* | (2006.01) |
| *G01C 21/36* | (2006.01) |
| *G06Q 10/0631* | (2023.01) |
| *G06Q 50/40* | (2024.01) |
| *H04W 4/02* | (2018.01) |

(Continued)

(52) U.S. Cl.
CPC ......... *G06Q 10/02* (2013.01); *G01C 21/3415* (2013.01); *G01C 21/3438* (2013.01); *G01C 21/3697* (2013.01); *G06Q 10/063114* (2013.01); *G06Q 50/40* (2024.01); *H04W 4/021* (2013.01); *H04W 4/023* (2013.01); *H04W 4/024* (2018.02); *H04W 4/46* (2018.02)

(58) Field of Classification Search
CPC ........ G06Q 10/02; G06Q 50/40; G06Q 50/43; G06Q 50/47
See application file for complete search history.

(56) References Cited

U.S. PATENT DOCUMENTS

2006/0034201 A1 2/2006 Umeda
2009/0326991 A1* 12/2009 Wei ........................ G06Q 10/02
705/5
(Continued)

OTHER PUBLICATIONS

S. Ma, Y. Zheng and O. Wolfson, "T-share: A large-scale dynamic taxi ridesharing service," 2013 IEEE 29th International Conference on Data Engineering (ICDE), Brisbane, QLD, Australia, 2013, pp. 410-421, doi: 10.1109/ICDE.2013.6544843. (Year: 2013).*
(Continued)

*Primary Examiner* — Scott M Tungate
(74) *Attorney, Agent, or Firm* — Jeffrey S. Melcher; Melcher Patent Law PLLC

(57) ABSTRACT

Provided are a fully automated dispatch system and method of dispatching self-driving vehicles that requires no direct communication between a dispatch person and the self-driving vehicle or passenger.

17 Claims, 48 Drawing Sheets

Related U.S. Application Data continuation of application No. 16/405,426, filed on May 7, 2019, now abandoned, which is a continuation of application No. 14/818,416, filed on Aug. 5, 2015, now abandoned.

(60) Provisional application No. 62/063,424, filed on Oct. 14, 2014, provisional application No. 62/034,343, filed on Aug. 7, 2014, provisional application No. 62/033,162, filed on Aug. 5, 2014.

(51) Int. Cl.
  *H04W 4/021* (2018.01)
  *H04W 4/024* (2018.01)
  *H04W 4/46* (2018.01)

(56) References Cited

U.S. PATENT DOCUMENTS

| | | | | |
|---|---|---|---|---|
| 2011/0153495 A1* | 6/2011 | Dixon | ................... | G06Q 20/10 235/384 |
| 2012/0084225 A1 | 4/2012 | Soldatenkov | | |
| 2012/0215572 A1* | 8/2012 | Schneur | ................ | G06Q 30/06 705/5 |
| 2013/0246301 A1* | 9/2013 | Radhakrishnan | .. | G06Q 30/0282 705/347 |
| 2014/0172727 A1* | 6/2014 | Abhyanker | ............ | G06Q 50/40 705/307 |
| 2015/0081362 A1* | 3/2015 | Chadwick | ............. | G06Q 50/40 705/7.14 |
| 2015/0296371 A1* | 10/2015 | Kong | ................ | H04M 1/72463 455/419 |

OTHER PUBLICATIONS

Barbeau, S., et al. "TRAC-IT: A software architecture supporting simultaneous travel behavior data collection and real-time location-based services for gps-enabled mobile phones." Transportation Research Board 88th Annual Meeting. vol. 21. 2009. (Year: 2009).*

* cited by examiner

FIG. 5B

< Back

Test Test
Tue - 04/15/2014
8:15 PM/20:15 (23h)
30838

| | |
|---|---|
| Service Type | Air - Greeter |
| Vehicle Class | Executive Sedan |
| Passenger Count | 1 |
| Luggage Count | 0 |
| Pickup | MIAMI INTERNATIONAL - MIA EZE<br>American Airlines<br>From/To:EZE<br>Flight #908 - ETA:06:42:00 |
| Dropoff | 1200 Anastasia Ave Coral Gables FL 33134 |

CONTACT MOVEO

FIG. 6B

| | |
|---|---|
| Service Type | Air - Greeter |
| Vehicle Class | Executive Sedan |
| Passenger Count | 1 |
| Luggage Count | 0 |
| Pickup | MIAMI INTERNATIONAL - MIA EZE<br>American Airlines<br>From/To:EZE<br>Flight #908 - ETA:06:42:00 |
| Dropoff | 1200 Anastasia Ave Coral Gables FL 33134 |

Test Test
MON - 04/14/2014
8:15 PM / 20:15 (now)
30838

CONTACT MOVEO | ON LOCATION

FIG. 6C

< Back

Test Test
MON - 04/14/2014
8:15 PM / 20:15 (now)
30838

| | |
|---|---|
| Service Type | Air - Greeter |
| Vehicle Class | Executive Sedan |
| Passenger Count | 1 |
| Luggage Count | 0 |
| Pickup | MIAMI INTERNATIONAL - MIA EZE<br>American Airlines<br>From/To:EZE<br>Flight #908 - ETA:06:42:00 |
| Dropoff | 1200 Anastasia Ave Coral Gables<br>FL 33134 |

| CONTACT MOVEO | ON LOCATION |

Back

Accepted 04/14/2014 20:22

SETTLE

| Waiting | 10 |
| Stops | 4 |
| Tolls | 65 |
| Parking | 50 |
| Misc | 30 | hi|

DISPATCH SYSTEM AND METHOD OF DISPATCHING VEHICLES

FIELD OF THE INVENTION

The invention relates to a fully automated dispatch system and method of dispatching self-driving vehicles that requires no direct communication between a dispatch person and the driver or passenger.

BACKGROUND OF THE INVENTION

Modern organization and operation of dispatch centers that provide livery car services, i.e., vehicles for hire, such as taxicabs or chauffeured limousines, typically require a human operator (dispatch person). The dispatch person carries out the reception of orders for taxicab or other livery car services via telephone. A person ("passenger") in need of a car service, i.e., a ride from a taxi or limousine, will call a taxi or limousine service and place an order verbally to a dispatch person directly. The dispatch person then determines which cars and/or limousines drivers are presently available for carrying out the particular order. Typically, the dispatch person and drivers are in two-way radio communication, operating at a particular radio frequency channel. Determining drivers available for a passenger pickup hinges not only on available drivers, but the driver's proximity to the passenger's pickup location, the drop-off or delivery location, the driver's schedule, etc. This requires that the dispatch person radio a number of drivers to request their location and availability, choose one who meets the preferred criteria, and assign the driver to the order.

During other known taxi and limousine management and dispatch operations, communications between drivers and dispatchers can be effected using driver mobile phones, for example, GSM based. In addition, a GPS system might be used to identify the exact location of all car and limousines that might be available for dispatch of a passenger's order. In a GPS-enabled dispatch system, the car or limousine typically includes a computer-based system for receiving navigation signals (GPS-enabled), a control block (microprocessor or microcontroller-based), memory blocks for storing needed data (for example, application programs, information about a car or limousine, etc.), and a transceiver, i.e., phone for implementing two-way radio transmission and reception of communications with dispatcher. Dispatch persons usually operate a computer-based system for transmission and reception of communications with the drivers (i.e., the electronics for in a driver car or limousine), a block of separation of communications, a database, and a display means.

Published U.S. Patent Application Nos. 2012/0084225 (Soldatenkov) and 2006/0034201 (Umeda) disclose automated systems for ordering taxicab services. However, both of these systems have shortcomings that are overcome by the present system.

There are problems in maintaining the quality of service with known livery car dispatching systems, and techniques for operation based thereon. The quality of service at any given time is dependent on the quality of the human dispatchers. Furthermore, a significantly greater number of employees is required by the prior art livery systems.

SUMMARY OF THE INVENTION

An objective of the present livery system and method is to overcome the problems with the present livery systems.

The present dispatch system and method includes the full (end-to-end dispatch automation system) and represents a new and novel approach to operating pre-arranged 'car service', e.g. 'limousine service', 'black-car service', or 'sedan service'. The present invention eliminates the need for human interaction. Human interaction is only required in the rare instance to correct problems that the automated livery system cannot handle. The present system and method includes high-level actions with sub-actions, if necessary. The system and method include end-to-end management of a ride that occurs during the five primary ride management phases (i.e. categories): Registration, Booking, Pre-Ride, Ride and Post-Ride. In addition to these five phases of the dispatching process, the present invention includes a novel notification system and method for the Driver App which allows the driver during the ride to notify dispatch of critical ride milestones and events using NFC (tap communication), which complies with the required hands-free operation.

The objectives of the present invention can be provided by a method of dispatching vehicles for hire comprising:
  providing a system comprising at least one cloud-based server comprising a non-volatile memory;
  logging onto the system by a booker;
  entering passenger information into the non-volatile memory by the booker;
  entering a pickup location and a drop-off location into the system by the booker;
  searching for a vehicle in the system by the booker;
  selecting a vehicle by the booker;
  determining by the system a best driver for the passenger;
  logging onto the system by the driver;
  entering driver information into a database stored in the non-volatile memory;
  automatically validating driver information by the system, and if the driver's information is validated, providing logon information for a driver app to the driver;
  running the driver app by the driver on a driver user interface device;
  automatically validating passenger information by the system, and if the passengers information is validated, providing logon information for a passenger app to the passenger;
  running the passenger app by the passenger on a passenger personal user interface device;
  validating by the system that the passenger app is running on the passenger user interface device;
  validating by the system that the driver app is running on the driver user interface device;
  determining by the system at least one route for the driver between the pickup location and drop-off location, and providing the at least one route to the driver app for the driver to view on the driver user interface device;
  picking up the passenger at the pickup location by the driver;
  determining proximity of the passenger to the driver by the system;
  confirming by the system that the driver and passenger are in the same location during a ride;
  using a function on the driver user interface device by the driver that meets hands-free requirements to communicate with the system to enter information to the system during driving of the passenger by the driver; and
  confirming by the system that the driver and the passenger are not in same location after the driver leaves the passenger at the drop-off location.

The objectives can also be met by a system for dispatching vehicles comprising:
  a cloud based server connected to a network, the cloud based server being in communication with or comprising at least one non-volatile memory;
  a driver user interface device in communication with the cloud based server via the network;
  a passenger user interface device in communication with the cloud based server via the network;
  a dispatch computer and/or dispatch user interface device in communication with the cloud based server;
  a driver app software module stored in the non-volatile memory, the driver app allowing a hand-fee communication between the driver and the system during driving a vehicle, and for allowing the driver to query where the passenger user interface device is located;
  a passenger app software module stored in the non-volatile memory, the passenger app allowing the passenger to query where the driver user interface device is located;
  a database stored in the non-volatile memory, the database comprising an account holder records database;
  registration software stored in the non-volatile memory, the registration software allowing a user to register with the system and become an account holder;
  booking software stored in the non-volatile memory, the booking software allowing an account holder to search for and select a vehicle, and to book a ride;
  vehicle price software stored in the non-volatile memory, the vehicle price software determining a price for the vehicle selected;
  validation software stored in the non-volatile memory, the validation software validating that the driver app and passenger app are running on the driver user interface device and passenger user interface device during a ride;
  proximity software stored in the non-volatile memory, the proximity software determining the proximity of the driver user interface device to the passenger user interface device and to determine when the driver and passenger are in the same location;
  best driver software stored in the non-volatile memory, the best driver software determining the best driver for the passenger, and if the driver rejects the ride determining the next best driver until a driver accepts the ride;
  driver location software located in the non-volatile memory, the driver location software monitoring the location of the driver before and during the ride, and providing the passenger app with the location of the driver; and
  route software stored in the non-volatile memory, the route software determining the best route for the driver and sending the best route to the driver app, and sending an alert to the driver if the driver deviates from the route during the ride.

The objectives can also be met by a computer readable medium storing instructions executable by a computing system including at least one cloud-based server and user interface device, wherein execution of the instructions implements the methods described herein.

BRIEF DESCRIPTION OF THE DRAWINGS

FIG. 5B illustrates an exemplary screenshot of a match between a driver 104 and a passenger 102.

FIG. 6B illustrates an exemplary screenshot of a recall function in the Driver App.

FIG. 6C illustrates an exemplary screenshot of a notification of change.

FIG. 6D illustrates an exemplary screenshot of a confirmation of driver location.

FIG. 7C illustrates an exemplary screenshot of the passenger closeout.

FIG. 9G illustrates an exemplary screenshot for settlement.

DETAILED DESCRIPTION OF THE INVENTION

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

The invention will now be explained with reference to the attached non-limiting Figs. The operations described in Figs. and herein can be implemented as executable code stored on a computer or machine readable non-transitory tangible storage medium (e.g., floppy disk, hard disk, ROM, EEPROM, nonvolatile RAM, CD-ROM, DVD, compact flash card, secure digital card, memory stick, RFID, Ruby, Memristor, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 1:
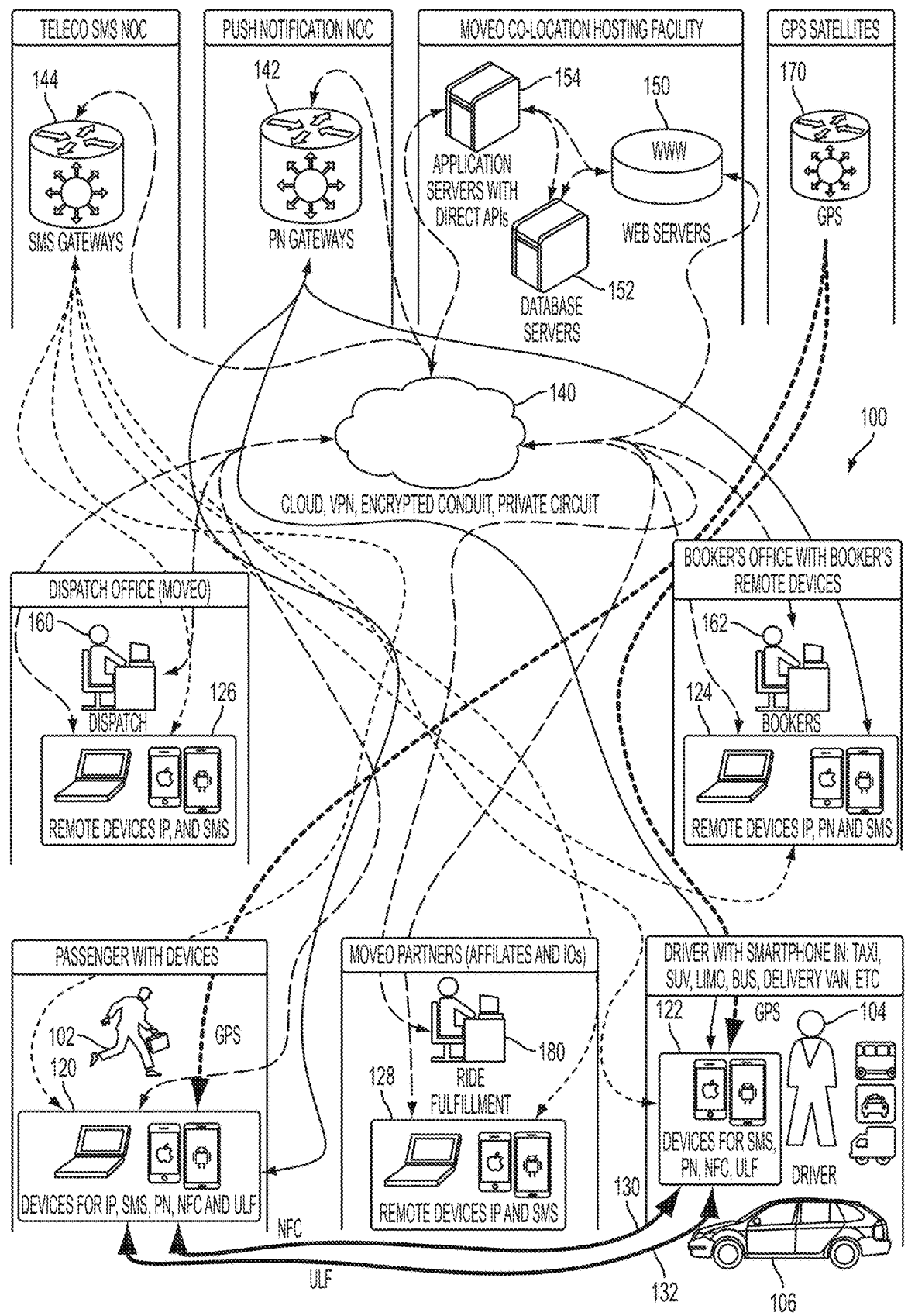
FIG. 1 illustrates an embodiment of the exemplary livery dispatch system 100.
Figure 2A:
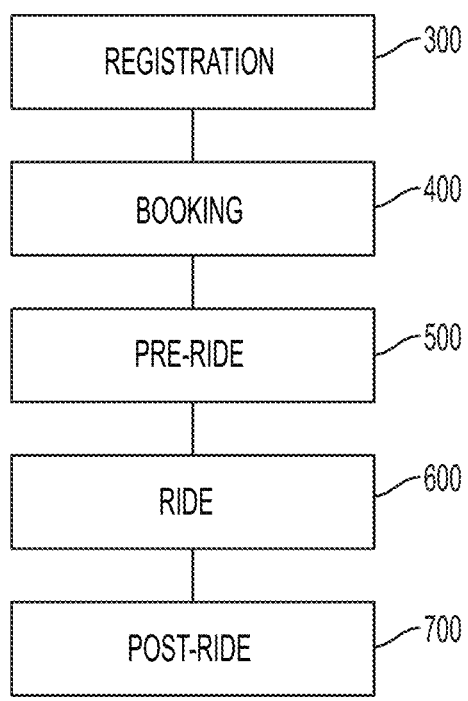
FIGS. 2A-2F illustrate a flow chart of an embodiment of the exemplary livery dispatch system 100.
Figure 2B:
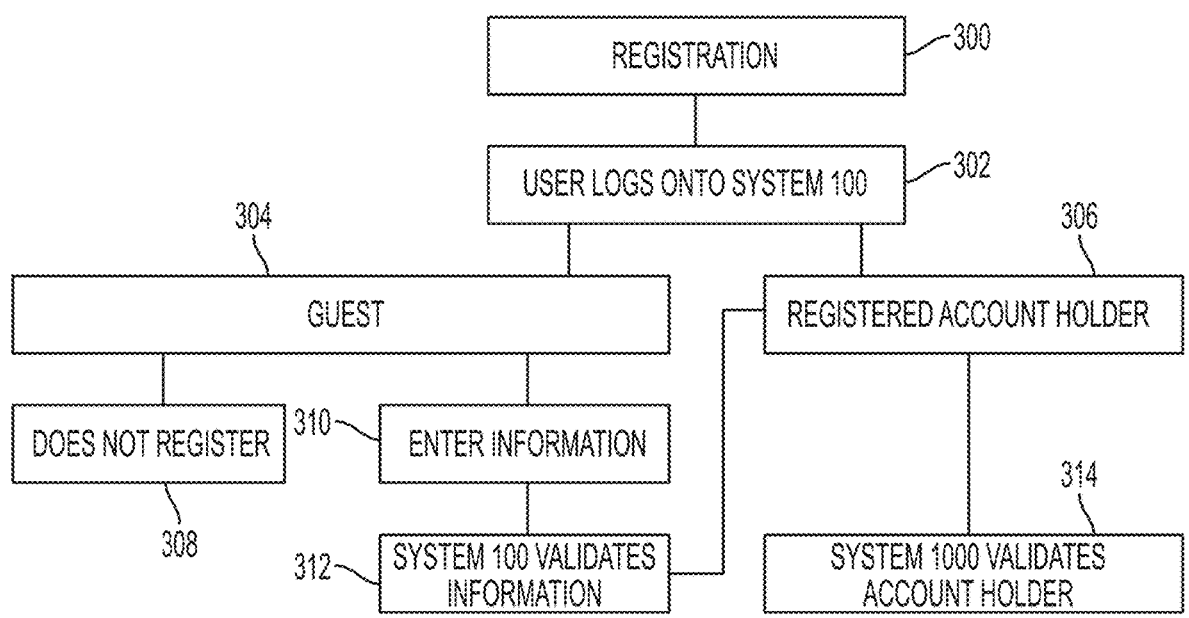
Figure 2C:
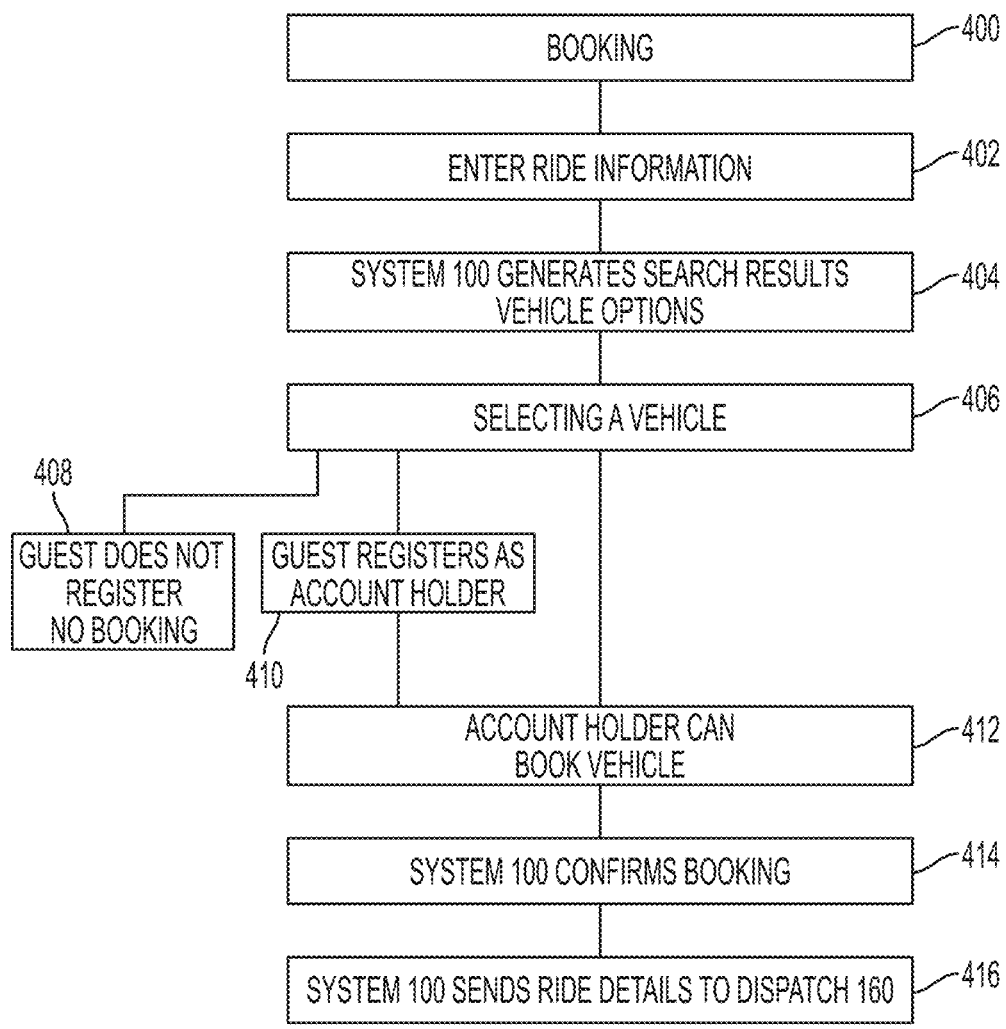
Figure 2D:
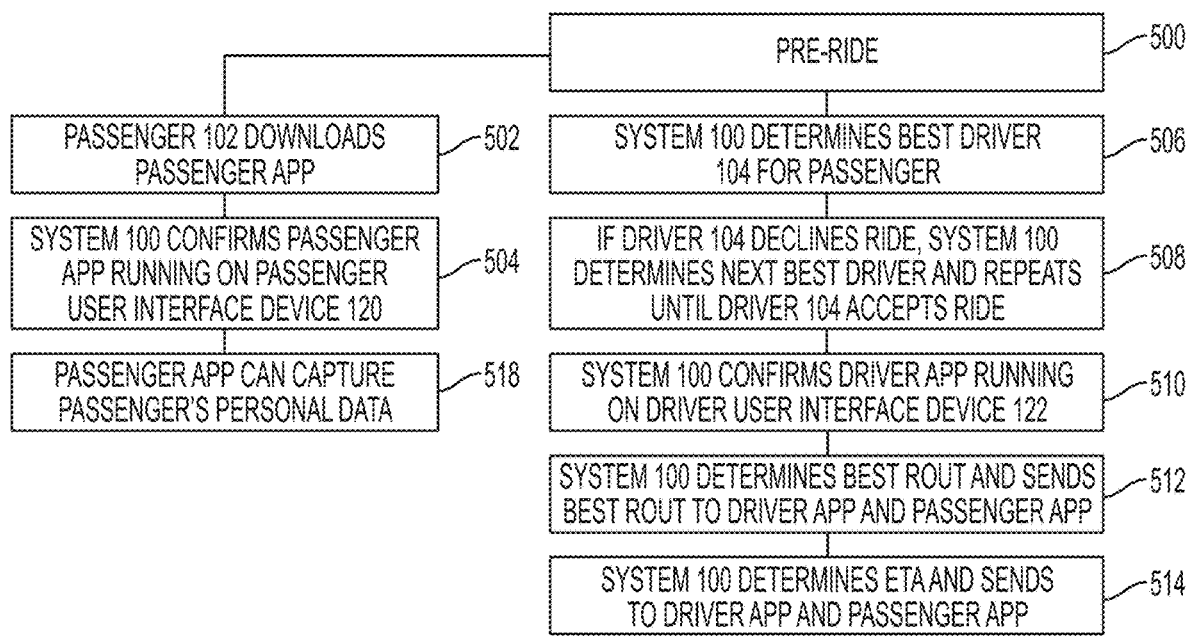
Figure 2E:
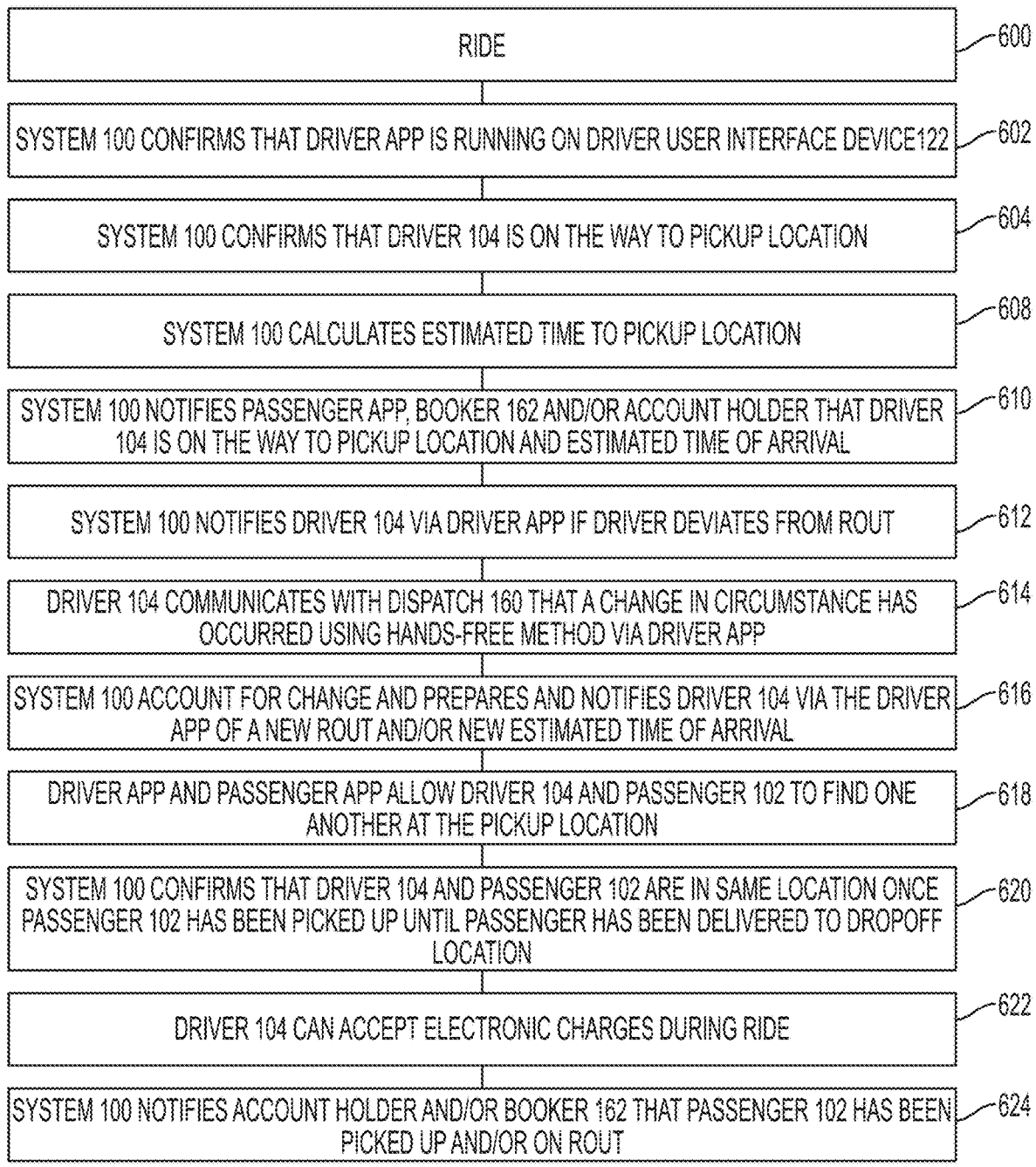
Figure 2F:
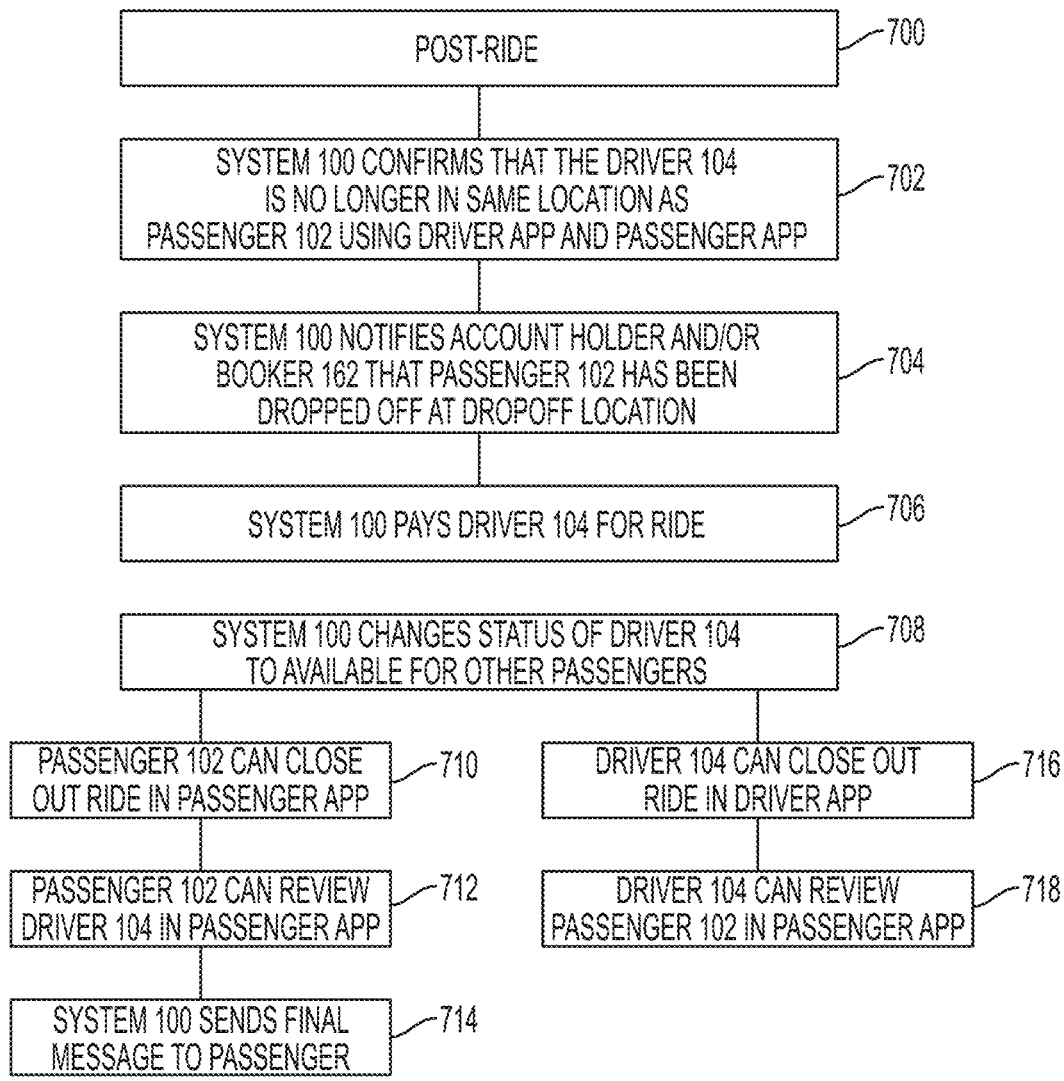

FIG. 1 describes a dispatch system 100 relating to a specific example of livery services. The dispatch system 100 comprises a plurality of user interface devices 120, 122, 124, 126, 128 and a main server 150 interconnected via any desired network 140 and/or telephone gateway 144. The dispatch 160, booker 162 and affiliate 180 can have associated stationary computers that can be interconnected with the of user interface devices 120, 122, 124, 126, 128 and a main server 150 via any desired network 140 and/or telephone gateway 144.

The network 140 includes the Internet, and can also include any of an Intranet, Extranet, Ethernet, or any other system that provides communications. Some suitable communications protocols may include TCP/IP, UDP, OSI, Ethernet, WAP, IEEE 802.11, Bluetooth, Zigbee, IrDa, Sound wave spectrum, all 802.xx VoIP protocols, or any other desired protocol. Furthermore, components of the system may communicate through a combination of wired or wireless paths.

The dispatch system 100 can be accessed via any user interface device 120, 122, 124, 126, 128, or stationary computer that is capable of connecting to the server 150. The user interface device 120, 122, 124, 126, 128 comprises a display, and preferably a touch screen display, and is mobile. The user interface device 120, 122, 124, 126, 128 can also comprise a camera and microphone for inputting pictures and sound. An exemplary preferred user interface device 120, 122, 124, 126, 128 contains a web browser or similar program, allowing in some embodiments for a secure SSL connection, and able to render and display HTML and CSS. This includes user interface devices 120, 122, 124, 126, 128 such as tablets, iPads, Mac OS computers, Windows computers, e-readers, and mobile user devices such as smartphones, including the iphone, Android, Windows Phone, other smartphones, smartwatches, smartcars, smartcar equipment, and other devices. Preferably, the user interface device 120, 122, 124, 126, 128 is a smartphone having a touch screen display. The user interface devices 120, 122, 124, 126, 128 can include voice commands, NFC, proximity sensor, capability for detecting waving hand or other at screen, camera, biometrics such as fingerprint, face recognition, iris, or DNA, gyroscope, compass and any other desired capabilities. The user interface devices 120, 122, 124, 126, 128 can connect to the server 150 via the internet 140 and/or through a mobile telephone network 144, and/or any other suitable medium. While not preferred, some user interfaces can be a SMS, IVR or PNS phone, except that the driver user interface 122 must be capable of running the Driver App.

The CPU of the user interface device 120, 122, 124, 126, 128 can be implemented as a conventional microprocessor, application specific integrated circuit (ASIC), digital signal processor (DSP), programmable gate array (PGA), or the like. The CPU executes the instructions that are stored in the memory in order to process data. The set of instructions may include various instructions that perform a particular task or tasks, such as those described herein. Such a set of instructions for performing a particular task may be characterized as a program, software program, software, engine, module, component, mechanism, or tool. The memory can include random access memory (RAM), ready-only memory (ROM), memristors, programmable memory, flash memory, and the like. The memory stores application programs (app's), OS, application data, and any other desired information. The exemplary user interface device 120, 122, 124, 126, 128 can also include a network module connected to an antenna to communicate with the dispatch system 100.

The server 150 described herein can include one or more computer systems directly connected to one another and/or connected over the network 140, such as web server 150, database server 152 and application server 154 shown connected to one another in FIG. 1. The server 150 can include one or more nodes and/or one or more servers in any configuration. Each computer system includes a processor, non-volatile memory, user input and user output mechanisms, a network interface, and executable program code (software) comprising computer executable instructions stored in non-transitory tangible memory that executes to control the operation of the server 150. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The server 150 can run any desired operating system, such as Windows, Mac OS X, Solaris or any other server based operating systems. Other embodiments can include different functional components. In addition, the present invention is not limited to a particular environment or server 150 configuration. Preferably, the server 150 is a cloud based computer system.

The server 150 includes a web server 150 and an application server (query processing unit) 154. The web server 150 receives user requests, such as from user interface devices 120, 122, 124, 126, 128 and sends the requests to the application server 154. The application server 154 processes the requests and responds back to the user interface devices 120, 122, 124, 126, 128 via the web server 150. The application server 154 fetches data from the database server 152 if additional information is needed for processing the requests. The database can be stored in the non-volatile memory. The term "database" includes a single database and a plurality of separate databases. The server 150 can comprise the non-volatile memory or the server 150 can be in communication with the non-volatile memory storing the database on the database server 152. The database server 152 can be stored at different locations.

The server 150 includes volatile memory. A portion of the database can be stored in the volatile memory while the system 100 is in operation.

Software program modules and data stored in the non-volatile memory of the server 150, database server 152, and application server 154 may be arranged in logical collections of related information on a plurality of computer systems having associated non-volatile memories. The software and data may be stored using any data structures known in the art including files, arrays, linked lists, relational database tables and the like.

The dispatch 160 includes a program that manages the system 100 during operation. The program can be run on a stationary computer and/or dispatch user interface device 126. For example, the dispatch 160 can track timing, g-forces, sound, speed, geolocation, drivers, passengers, vehicles, confirmations, changes, and other functions associated with dispatching without the use of person-to-person calls between a dispatch person and the driver or passenger. Preferably, there is a dispatch person to monitor the operation of the dispatch 160 program, and to conduct the rare call to the driver 104 or passenger 102 that is required when computer automation cannot handle the specific issue. Dispatch 160 can have an associated stationary computer and/or a dispatch interface device 126 for use by the dispatch person. The dispatch 160 can be connected to the server 150 by network 140. The dispatch 160 is connected to the passenger user interface device 120 and driver user interface device 122 through the network 140.

The booker 162 is a person who books a ride with the system 100, using a booker user interface device 124 or stationary computer. The booker can be the passenger 102, a potential passenger, a person, a corporation, or any entity booking the ride on behalf of the passenger 102. The booker 162 and passenger 102 can connect to the system 100 through the network 140 and book a ride without any person-to-person interaction. In the rare occasion a personal conversation between the dispatch person and the passenger 102 or booker 162 is required, the dispatch person can connect to the passenger user interface device 120 or booker user interface device 124 through the SMS gateway 144. The gateway 144 can be another desired gateway, such as PNS gateway 142.

The affiliate 180 is an entity that has drivers and vehicles that can be utilized by the system 100. For example, the affiliate can be a limousine or taxi company. The affiliate 180 can be a company that does not advertise directly for passengers. The affiliate 180 can communicate with the system 100 by a stationary computer and/or an affiliate user interface device 128.

The push notification service (PNS) 122 allows notices to be pushed to many different types of devices in different formats. For example, a text notification can be pushed to an email notification.

The SMS gateway 144 can be any well-known telecommunications system utilized by wireless telephones.

The GPS 170 can be any global positioning system to provide a location for each of the driver user interface device 122 and passenger user interface device 120. The user interface devices 120 and 122 can communicate with the system 100 and GPS 170 to provide the locations of the driver and passenger in real time.

Ultralow frequency signals, ULF 132, can be sent between the driver user interface device 122 and the passenger user interface device 120. The ULF 132 signal can be modulated to determine the distance between the driver 104 and passenger 102 user interface devices 120, 122 so that driver 104 and passenger 102 know where each are in relation to one another. The ULF 132 can also be used to determine when the passenger 102 has been picked up to confirm pickup, if passenger 102 and driver 104 are in close proximity, and whether the driver 104 and passenger 102 have separated to confirm drop-off. ULF 132 has been used as an example, and other sound frequencies can be used in place of ULF, such as near ultrasound and ultrasound. In addition or in place of, confirmation of pickup and drop-off can be confirmed by g-force, geolocation, or other of the driver user interface device 122 and passenger user interface device 120.

The server 150, dispatch 160 computers, booker 162 computers, affiliate computers 180, and user interface devices 120, 122, 124, 126, and 128 can be programed to perform the methods described herein. The following example of a livery system will be used to further explain the invention without limitation thereto.

In the livery example, the following terms are used. Once a person logs onto the system 100, that person becomes a user. The user can be a registered account holder or a guest. Registered account holders can be potential passengers, potential corporate clients, returning passengers, corporate clients, bookers, drivers, affiliates and agents. The system 100 allows guests (type of user) to log on. For example a potential passenger, potential corporate client, potential agent, potential affiliate, potential driver, or any other person can log onto the system 100 as a guest. Once the guest is registered, the guest becomes a registered account holder.

Once a ride is booked the potential customer becomes a passenger. Once the corporate client books a ride, a potential passenger associated with that corporate client becomes a passenger. The term customer refers to an account holder that has booked at least one ride, and can be a passenger or a booker. The term agent refers to an external sales representative that promotes company services, such as a concierge, parking/valet manager, etc.

FIGS. 2A-2F illustrate a flow chart of the livery example. Registration 300

Figure 3A:
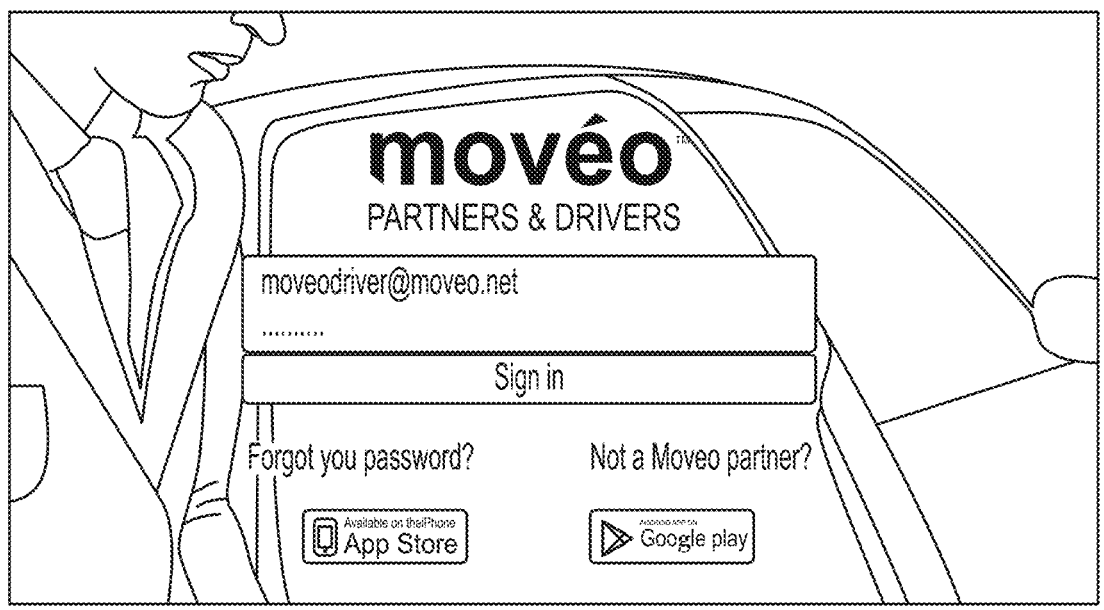
FIG. 3A illustrates screenshot of a driver log-on to the system.
Figure 3B:
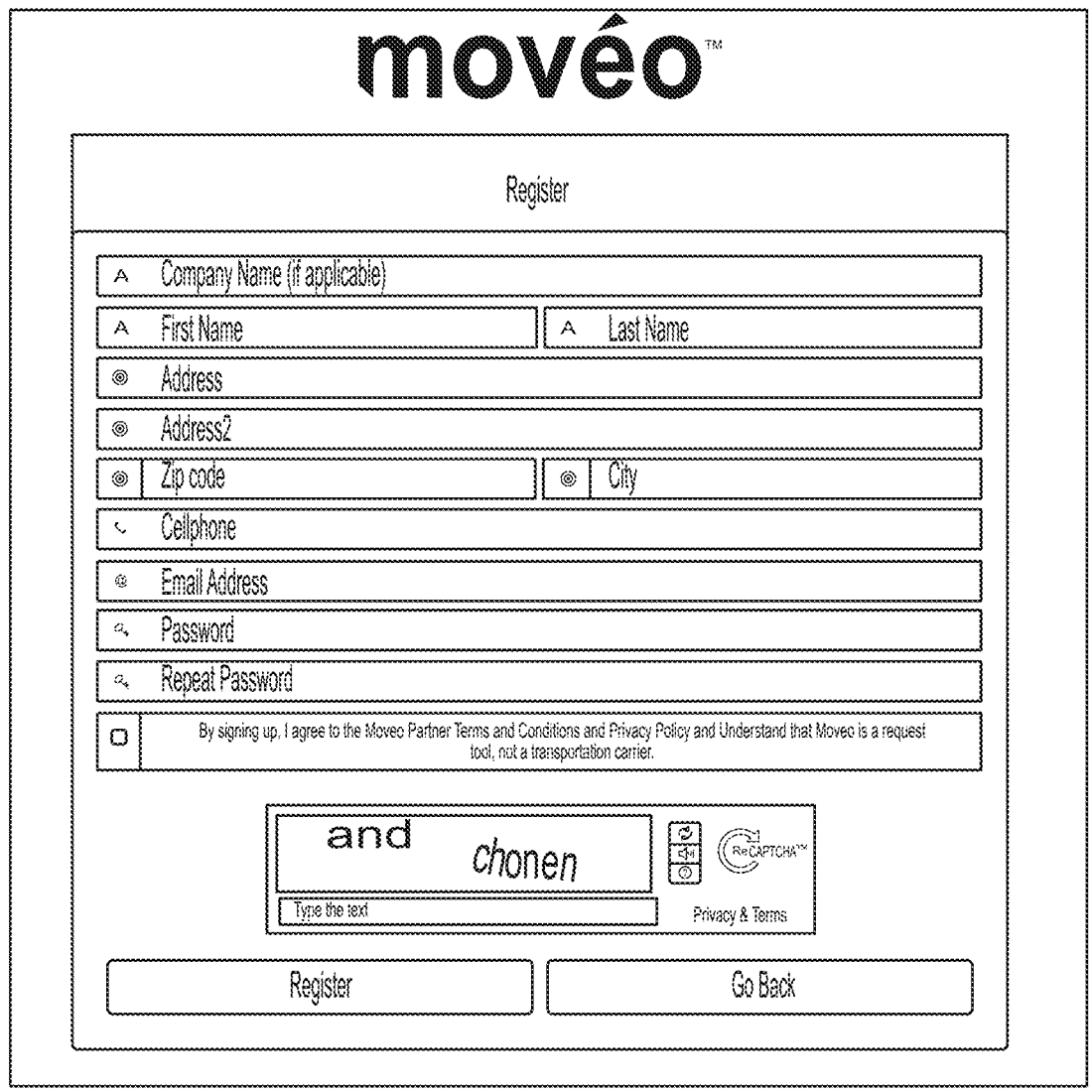
FIG. 3B illustrates screenshot of driver information.

The driver 104 logs onto the server 150 using a driver user interface device 122, which is preferably a smartphone, shown at 302. An example of a logon screenshot is shown in FIG. 3A. If the driver 104 is new to the system 100, the driver 104 is a guest, shown a 304. Driver information, and when relevant company information (for Drivers who are associated with Affiliates or Independent Operators "IOs"), can be entered by document scan (upload documents) and/or entered manually when there is no document available into the Drivers Portal, shown at 310. The driver 104 can opt not to register and leave the system 100, shown at 308. FIG. 3B shows an exemplary screenshot where driver information, such as contact information including company name, driver name, address, cellphone, email, and password can be entered.

Figure 3C:
FIG. 3C illustrates screenshot of driver information for driver's associated with an affiliate or IO company.

For a driver 104 who is part of an Affiliate or IO company, the following information can be entered to the server 150: EIN, Company Address, Company email, Company contact information, Company phone number, Vehicle Profile—vehicle model, exterior color, year, passenger capacity, luggage capacity, and unique features; VIN; Tag # and; Permit #. An example screenshot is shown in FIG. 3C.

Figure 3D:
FIG. 3D illustrates a screenshot of driver personal information.

For a driver 104, whether supplied by Driver or Affiliate/IO Name, the following information is preferably entered to the server 150: Address, DoB, Gender, Languages spoken, Driver's license number, Insurance Policy number, tax ID number, (SSN or TIN, or National ID or other government issue tax or ID number) and if not entered as an Affiliate or IO, (as shown in the screenshot of FIG. 3C) Vehicle Profile 106—vehicle model, exterior color, year, passenger capacity, luggage capacity, and unique features; VIN; Tag #; Permit #. An exemplary screenshot of a driver personal information is shown in FIG. 3D.

Automatic validation of corporate information is conducted by the system 100 if corporate information is entered to the server 150. For example, the system 100 can conduct automatic corporate validation by any one of the following methods: generating an email for email validation; verifying address via 3rd party geo location service; calling via IVR for phone verification call and/or SMS PIN Verification; and/or verifying EIN, Permit, VIN, Tag # and Insurance verifications via 3rd party APIs that conduct validation services. If automatic validation of corporate information fails, the system 100 escalates to an automatic live operator call from dispatch 160 (dispatch person) to driver 104 using the dispatch user interface device 126 and driver user interface device 122.

Automatic validation of driver information is conducted by the system 100 after driver information is entered to the server 150, shown at 312. For example, the system 100 can conduct automatic driver validation by any one of the following methods: generating an email for email validation; verifying the address via a 3rd party geo location service; validating phone number using IVR call with validation options; validating the mobile number via SMS with return code validation; and/or validating Tax ID, Permit, VIN, Tag #, Insurance Policy, Driver's License, Drivers Citation, Accident History, background check, credit check, other database searches, and OFAC screen verifications via 3rd party APIs to validation services. Once the driver 104 completes registration, the driver 104 is a registered account holder. If the automatic validation fails, the system 100 escalates to automatic live operator call from dispatch 160 (dispatch person) to driver 104 using the dispatch user interface device 126 and the driver user interface device 122.

Figures 3E, 3F:
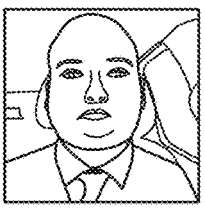
FIG. 3E illustrates a screenshot of a company administration level logon.
FIG. 3F illustrates a screenshot of driver personal information.

If automatic validation is successful, the driver 104 is provided logon information for a smart-phone Driver App that is run on driver user interface device 122 throughout the entire passenger 102 ride, shown at 510. The system 100 can automatically generate prepaid debit card ("moveomoney") fulfill to the driver 104 for compensation, shown at 716. Any desired driver compensation can be used, with electronic payment being preferred. An example is shown in the screen-shot of FIG. 3G. The company employing the driver 104, such as an affiliate 180, can be provided with admin level logon information for Driver Portal for full ride management further registration related actions including: Modify or Edit, and Enable or Disable. An example is shown in the screenshot of FIG. 3E.

An automatic notification process for expiration of driver documents (Insurance, Driver's License, Permits, Vehicle Age, etc.) and/or by threshold algorithm (e.g. too many complaints, low driver rating, etc.) can be provided by the system 100. An example screenshot is shown in FIG. 3E. Automatic disabling of the driver by the system 100 can be performed if any required driver documentation expires, for example insurance, driver license, permits, vehicle age (after notification and probation period), and/or other required documents. An example screenshot of the driver's information is show in FIG. 3F. A manual process can be used for non-validatable information and documents.

Figure 3G:
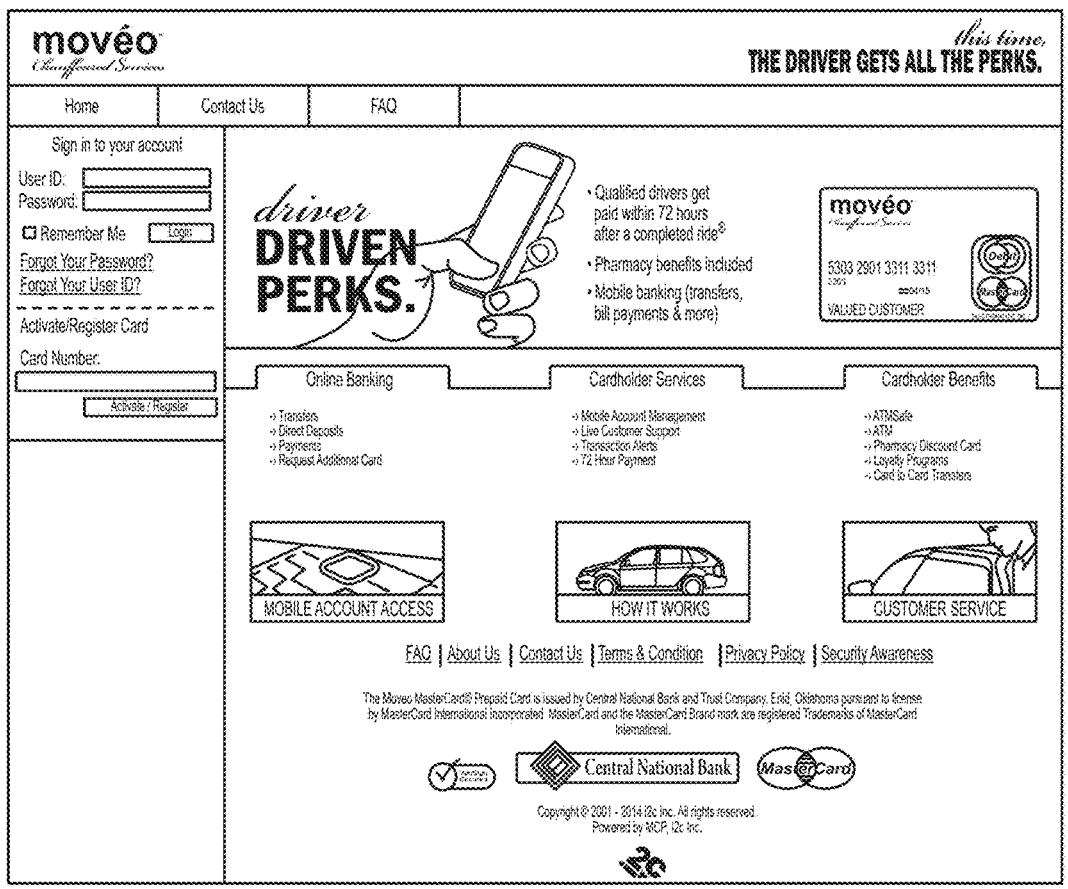
FIG. 3G illustrates an example of prepaid card.
Figure 3H:
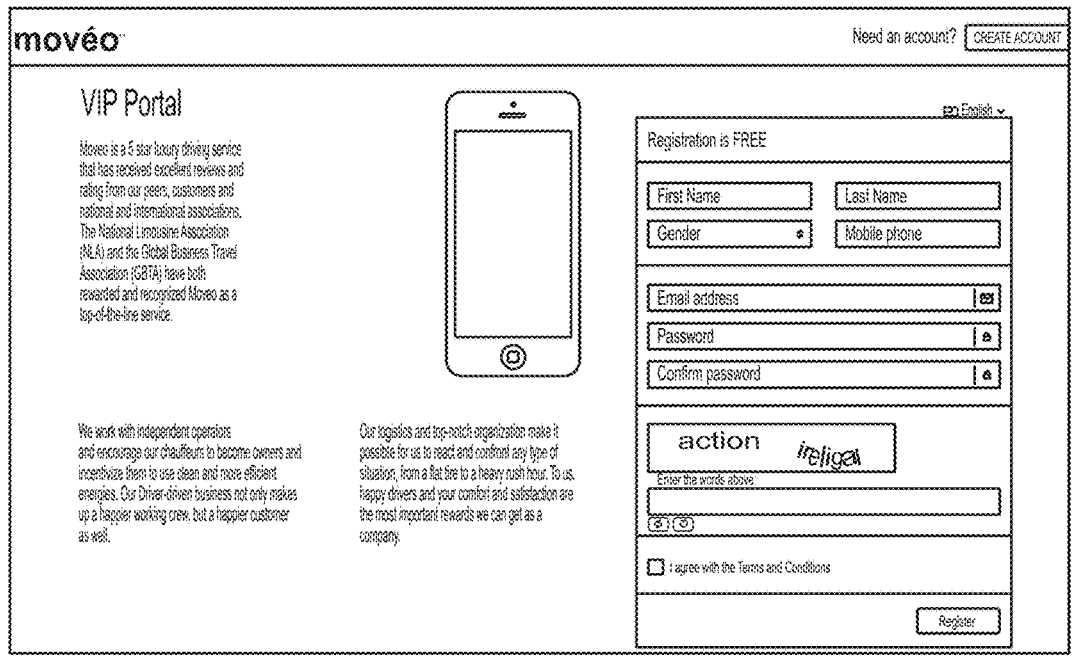
FIG. 3H illustrates a screenshot of an account holder portal.
Figure 3I:
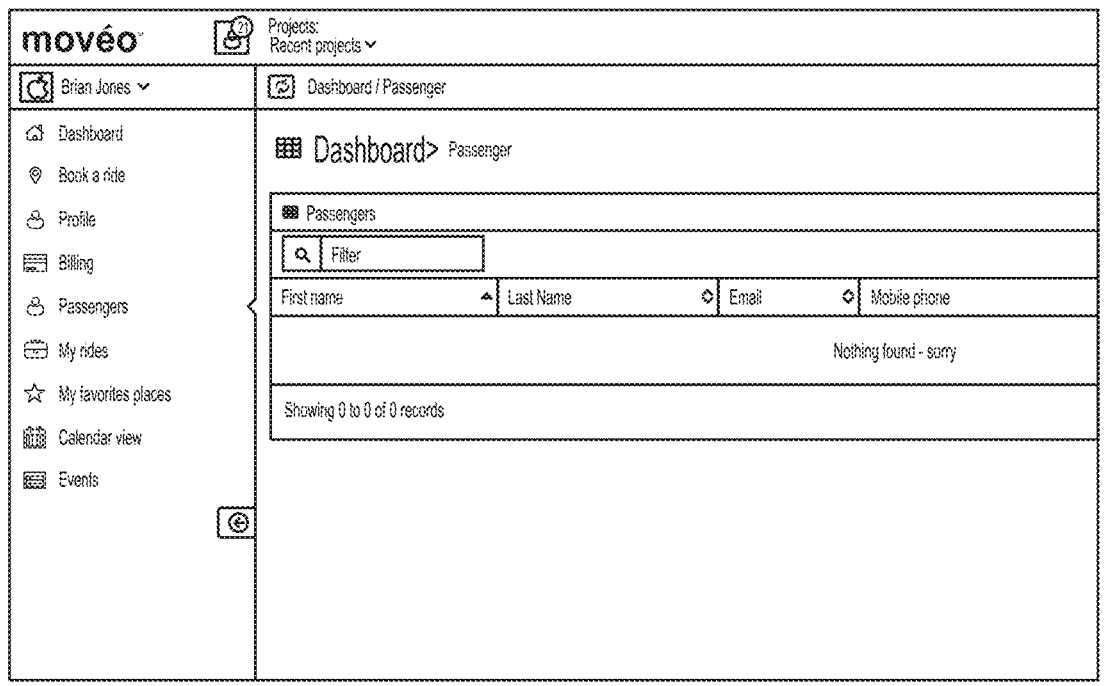
FIG. 3I illustrates a screenshot of a passenger dashboard.
Figure 3J:
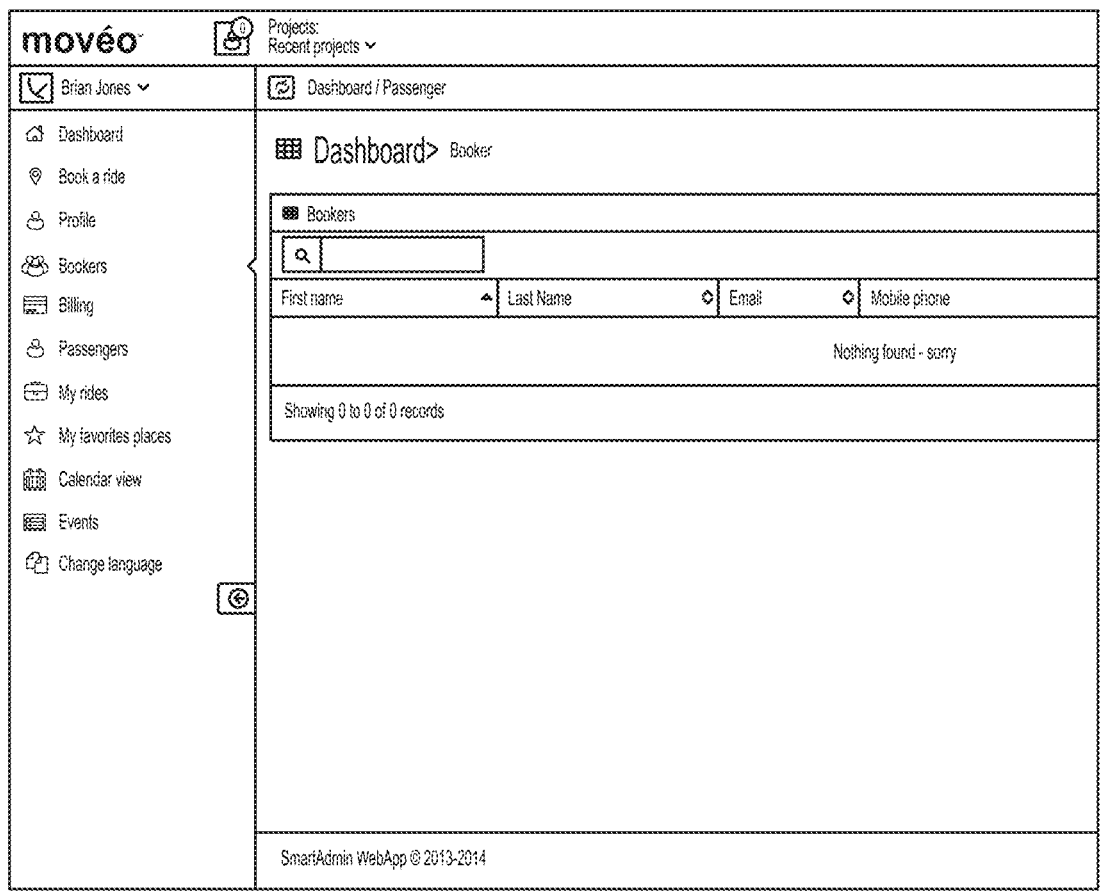
FIG. 3J illustrates a screenshot of a booker dashboard.

Account holders can log onto the system 100, shown at 306, and an automatic validation for account holders can be conducted, shown at 314. An example of an account holder portal screen-shot is shown in FIG. 3H, for entering account holder information. An example of a booker dashboard screen-shot is shown in FIG. 3J. The following account holder information can be entered into the account holder portal: company name; booker 162 name(s) (i.e. those authorized to book rides—all bookers 162 can be passengers 102); passenger 102 names (an exemplary screenshot is shown in FIG. 3I); company address, company telephone number(s), fax number(s), email address(es), passenger mobile number(s); passenger email address(es); company EIN; (for bookers 162 and passengers 102); company preferences; (e.g. spending limits or spending profiles, per ride maximum, per day maximum, per week maximum, per month maximum, and can be apply to a booker budget or per passenger expenses made by a booker 162, alerts to account holder if booker 162 or passenger 102 exceed threshold set by account holder, security requirements, location profiles, drivers, and other variables); booker(s) preferences; passenger(s) preferences; company payment profiles; ride management permissions; and other information.

The account holder information can be automatically validated by the system 100 by any one or more of the following methods: generating email for email validation; verifying address via 3rd party geo location service; validating phone number use IVR call with validation options; validating mobile number via SMS with return code validation; and validating email addresses. If the automatic validation fails, the system 100 escalates to automatic live operator call from dispatch 160 (dispatch person) to the account holder. The system 100 can automate login password registration. The system 100 can utilize Automated Clearing House (ACH) information to automate alternate forms of payment.

For passengers, the following information can be entered into the account holder portal: name; other booker name(s) (exemplary screenshot shown in FIG. 3G) (i.e. those authorized to book rides—all bookers can be passengers); other passenger names; home phone (optional), fax number(s), email address(es), passenger mobile number(s); other passenger email address(es); passenger(s) preferences; (e.g. spending limits, type of car, security requirements, location profiles, drivers, and other variables); booker(s) preferences; passenger(s) payment profiles; ride management permissions; and other information.

Agents can be registered by entering the following information into the Agent Portal: entity name (individual or company); home or company phone number, fax number, email address, mobile number; and other agent relevant information.

The agent can be automatically validated by the system 100 by any one or more of the following methods: generating an email for email validation; verifying address via 3rd party geo-location service; validating phone number by IVR call with validation options; validating mobile number via SMS with return code validation; and verifying email addresses. If the automatic validation fails, the system 100 escalates to automatic live operator call from dispatch 160 (dispatch person) to driver 104 using the dispatch user interface device 126 and the driver user interface device 122.

Once the agent is validated by the system 100, a promo/agent code can be generated, which automatically embeds links for agents when they share the company name, such as Movéo, via social media. Agent is sent a link for using when the agent shares the company name through email or SMS. An agent can be compensated through funds being loaded directly onto an automatically generated prepaid debit card ("movéomoney"). An example is shown in the screenshot of FIG. 3G.

Booking 400

Figure 4A:
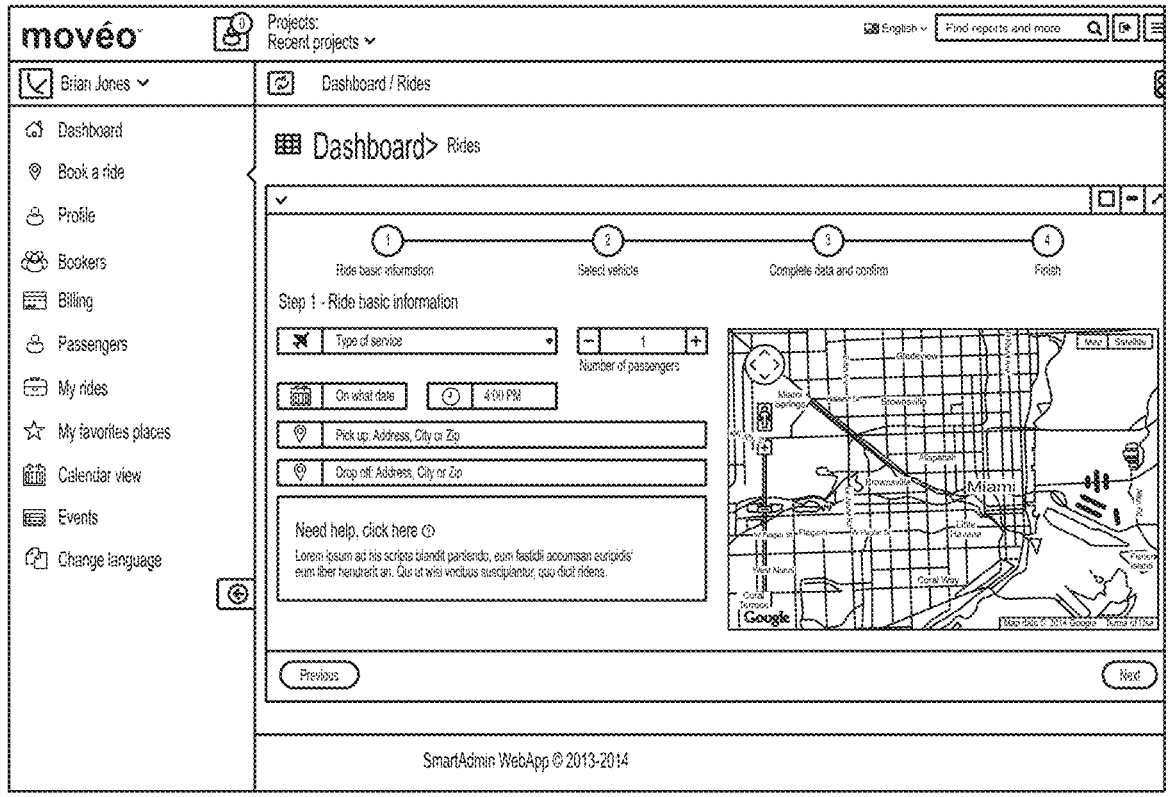
FIG. 4A illustrates search screenshot for registered account holders.
Figure 4B:
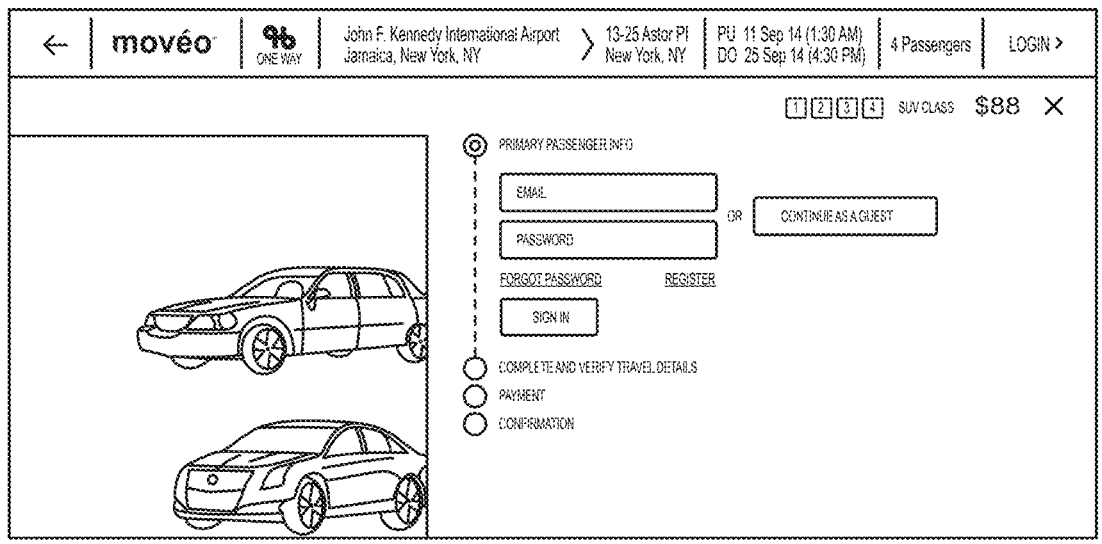
FIG. 4B illustrates search screenshot for guests.

Searches for can be conducted by registered account holders by entering all desired ride data, such as for example date and time, pickup location, drop-off location, service type (from airport, to airport, hourly, point-to-point), and number of passengers, as shown at 402. An exemplary search screenshot for registered account holders is shown in FIG. 4A. Similar searches can also be conducted by a guest by entering desired ride information. An exemplary search screenshot for a guest is shown in FIG. 4B. However, the searches for guests can be limited, such as preferences, discounts and VIP services only being searchable, managed and/or updated by registered account holders.

Figure 4C:
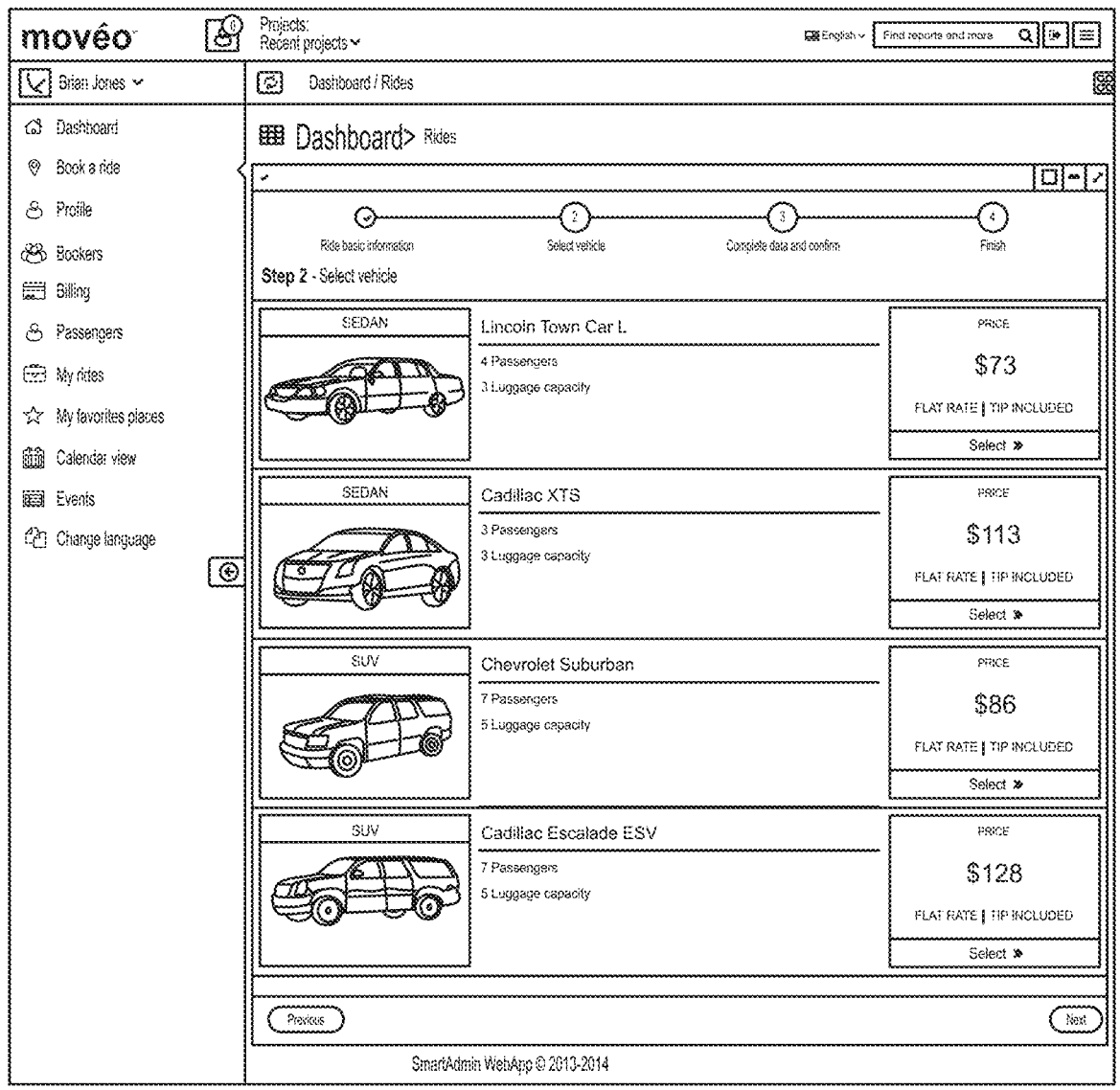
FIG. 4C illustrates an example of a screenshot showing the ride search results.

The system 100 utilizes algorithms that can factor collected data from both search and real-time pricing variables (internally stored and/or generated) including, but not limited to, the following examples: device (e.g. Mac vs. PC vs. mobile phone); IP address (i.e. for locations, e.g. international, domestic, high-value locations, local user, etc., Point of Interest "POI"); Operating System; number of searches; seasonal demand; day of the week; time of day; cookie benchmarking; ride history (e.g. historical data by service type); alternative transportation events (e.g. air, train, boat); network (movéo) inventory or supply (e.g. vehicle type); market pricing (e.g. competitor pricing); events (sports, entertainment, holidays, etc.); lead time; and other price sensitive variables. For example: If a ride is booked seven days in advanced a first price shows up. If that same ride is booked forty-five minutes in advance (as soon as possible) the price may fluctuate due to a shorter lead-time. An example of a screenshot showing the ride search results is shown in FIG. 4C.

Figure 4D:
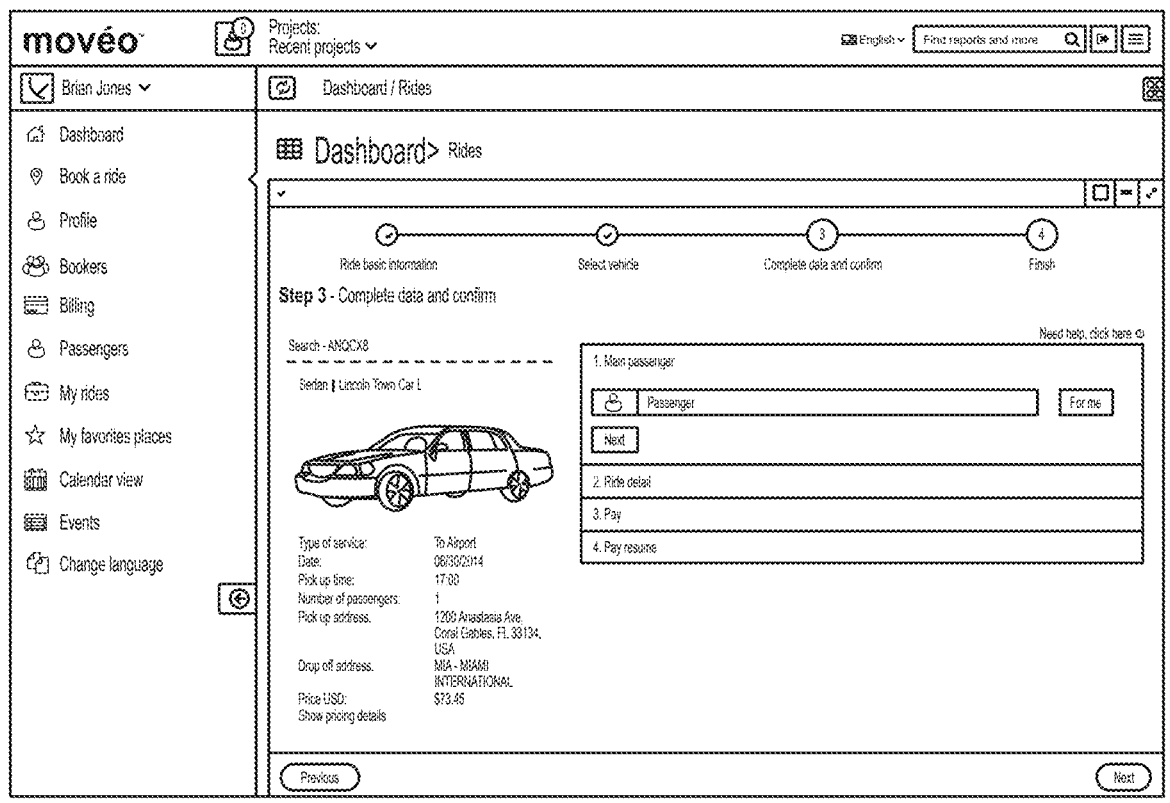
FIG. 4D illustrates an example of a screenshot for vehicle selection and passenger information.

Once the ride search results are displayed, shown at 404, the registered account holder can select a vehicle 106, shown at 406. An exemplary screenshot for vehicle selection is shown in FIG. 4D. Primary passenger information is entered by the guest or pre-population is edited by logged on registered passenger 102 or booker 162. An exemplary screenshot for passenger information is shown in FIG. 4D.

Figure 4E:
FIG. 4E illustrates an exemplary screenshot for entering addition travel details.

Travel details that were not entered during the search can be entered into the system, such as airline, international flight or domestic flight, luggage volumes, number of stops, additional address info, additional destination information, car seats, excess luggage, curbside pickup, and any other desired information. An exemplary screenshot for entering addition travel details is shown in FIG. 4E.

Figure 4F:
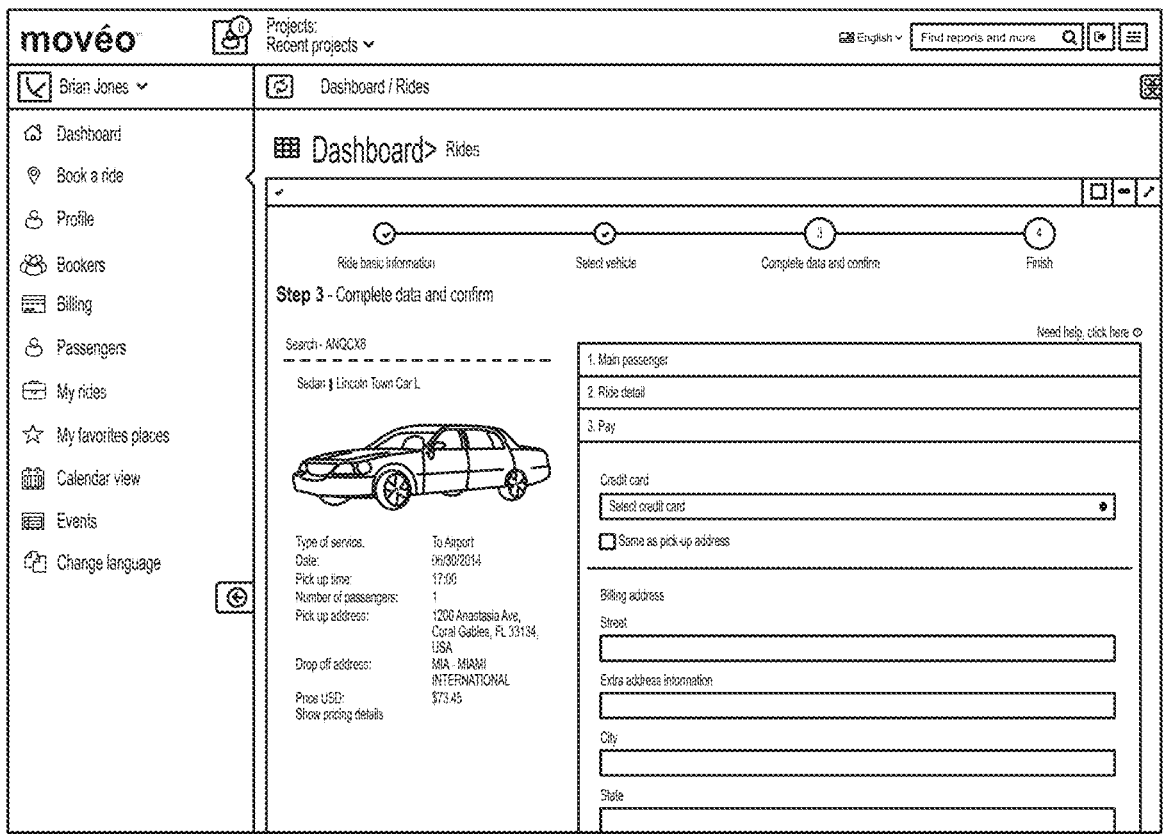
FIG. 4F illustrates an exemplary screenshot of a checkout page.
Figure 4H:
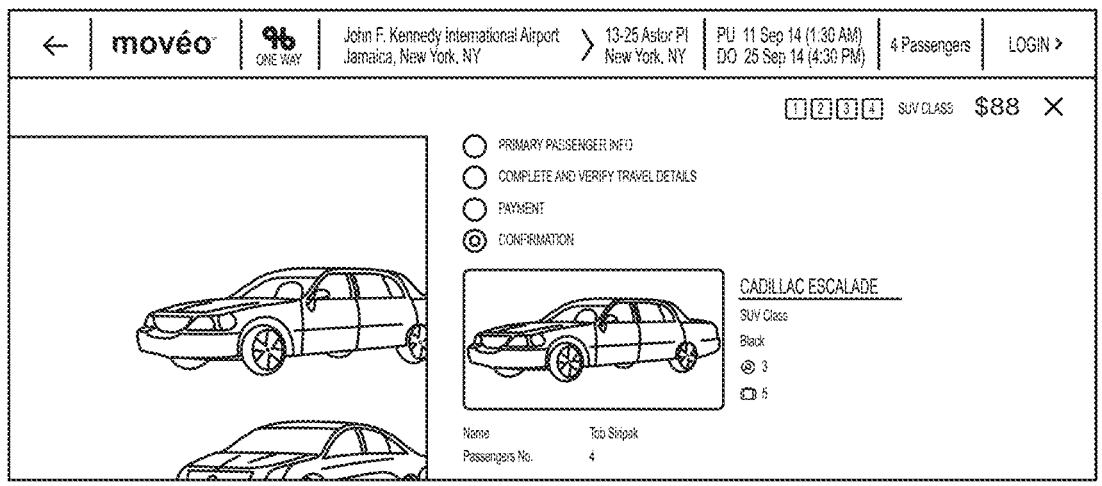
FIG. 4H illustrates an exemplary screenshot providing upsell options.

Once all desired travel information is entered into the system 100, a checkout page can be displayed. An exemplary screenshot of a checkout page is shown in FIG. 4F. Upsell additional service options can also be displayed, for example, hourly service for non-home destinations. An exemplary screenshot providing upsell options is shown in FIG. 4H. The upsell options can generated by the system 100 using an algorithm that detects the passenger current location, market surplus, or profiled location to determine the likelihood that the ride will result in additional bookings (such as a flight departure flight destination that is not the same as the home market), passenger ride history, passenger profile data, and information. Other upsell options are upgrades to different vehicles, such as a luxury vehicle or armored vehicle. Other upsells options include an upgrade to a bodyguard or armed driver 104. An exemplary screenshot for ride payment by account holders is shown in FIG. 4F.

Figure 4I:
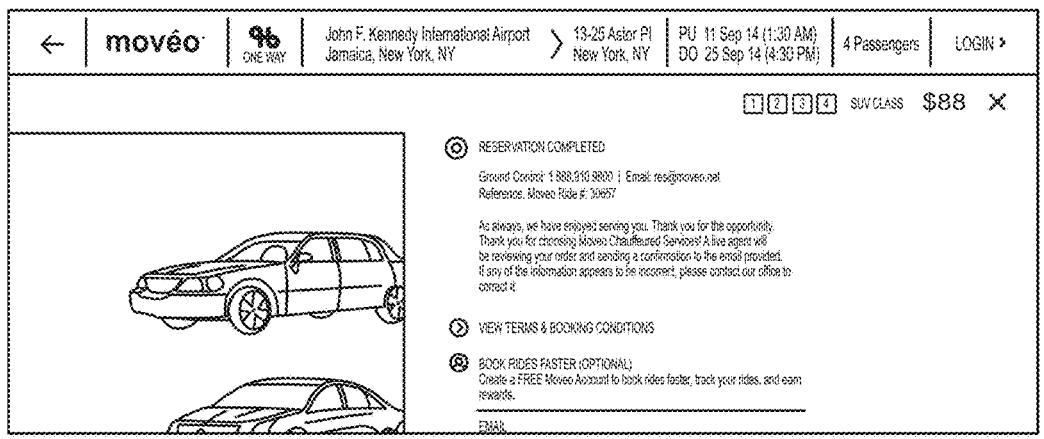
FIG. 4I illustrates an exemplary screenshot of guest registration for account.
Figure 4J:
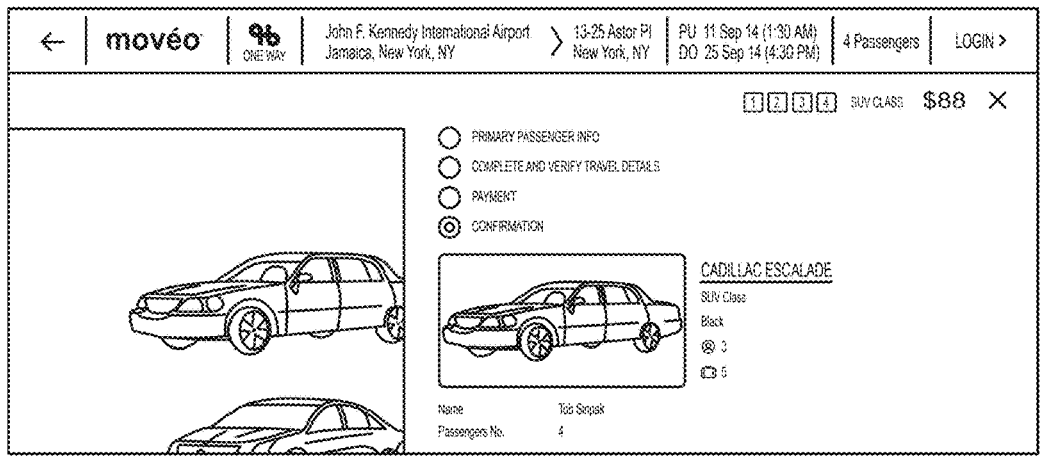
FIG. 4J illustrates an exemplary screenshot of a promo code/discount for next booking.

Once the vehicle 106 is selected, a guest has the option to not register and leave the system, shown at 408, or register as an account holder, shown at 410. Guests can be required to register for an account and create a logon before being allowed to book a ride. An exemplary guest registration for account screenshot is shown in FIG. 4I. After payment, the system 100 can generate a promo code/discount for the next booking, of which an exemplary screenshot is shown in FIG. 4J. If payment is approved, the system 100 generates and sends a confirmation. Preferably, only an account holder can book a vehicle, shown at 412.

Figure 4K:
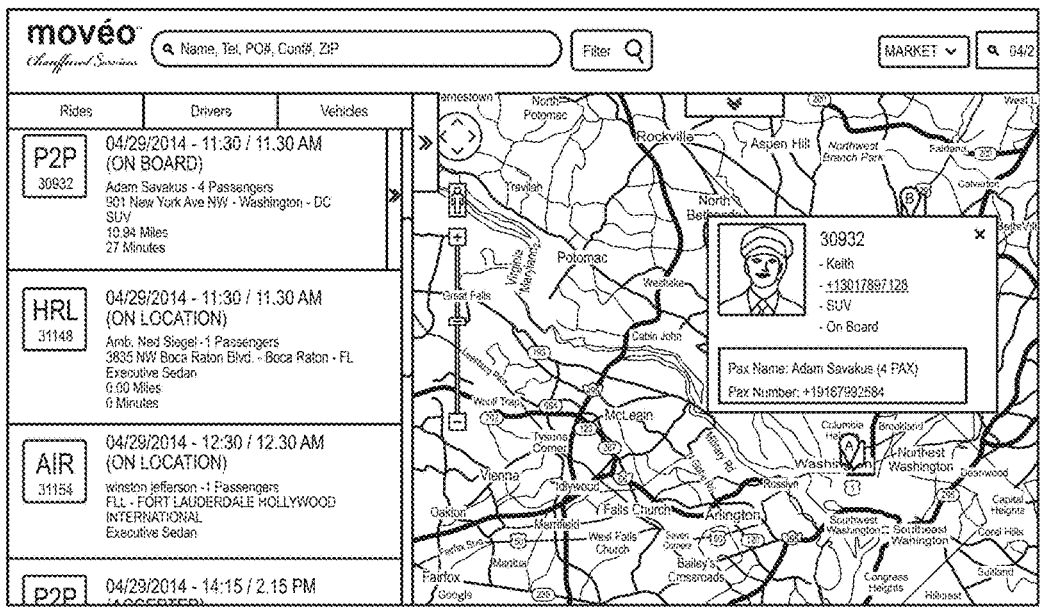
FIG. 4K illustrates an exemplary screenshot of a client portal.

After confirmation is sent, shown at 414, the system 100 enters the ride details into dispatch 160, shown at 416. The client portal enables VIP customers (bookers 162), such as event planners, travel agents, corporate travel managers, governments, etc., to have a complete view of their employees, customers and/or other key stakeholders as they move through the system from Registration, Booking, Pre-Ride, Ride and Post-Ride. An example of a screenshot of the client portal is shown in FIG. 4K. The client portal can include location (such as via GPS trail), order status, changes, events, and other key information. The client portal can also include multiple roles for passenger profiles, bookers and payment profiles. A limited client portal can be configured with limited scope and features for passengers 102 in the Passenger App discussed below. The system 100 can include concierge service, such as sending flowers or other items.

Pre-Ride 500

Once booking of the ride is completed, the passenger downloads the Passenger App onto the passenger user interface device 120, shown at 502. The Passenger App is discussed in detail below. The system 100 confirms that the Passenger app is installed and running, shown at 504.

Confirmation can be obtained by any of mobile phone number, pickup location, or other method, for example: generating an automated phone call via SMS/IVR to confirm the phone number; generating an email; and using geo coordinates to confirm passenger user interface device 120 location. For passenger validation, the system 100 verifies that the passenger 102 never sent a STOP command to not receive SMS notifications. The system 100 generates an automatic email to explain to the customer how to re-enable SMS notifications if the STOP was entered. The system 100 can send reminders via, email and SMS to download the Passenger App. The system 100 can use push notification if there is no response to SMS or email. If account is corporate, the system 100 can notify the account holder or booker 162 via SMS and email, or use push notification. If the automatic validation fails, the system 100 escalates to automatic live operator call from dispatch 160 (dispatch person) to driver 104 using the dispatch user interface device 126 and the driver user interface device 122.

The system 100 can validate flight number and airline combination, and validate that the airline code and flight number is the origination or destination for the airport. For airport pickups and drop-off, the system 100 can confirm accuracy of both departure and arrival flight numbers. If the automatic validation fails, the system 100 escalates to automatic live operator call from dispatch 160 (dispatch person) to driver 104 using the dispatch user interface device 126 and the driver user interface device 122.

The system 100 uses algorithms to match the best driver 104 to the passenger 102, shown at 506. The system 100 can match best driver 104 alone, or the combination of best driver 102 and vehicle 106 as a unit. An exemplary screenshot showing a match between the driver 104 and passenger 102 is shown in FIG. 5B. An algorithm for matching the best vehicle/driver 104 to the passenger 102 can weigh any the following exemplary primary variable inputs to produce a list of the top scoring drivers 104 that the ride can be offered: driver profile, which includes, languages spoken, and country of origin; type of vehicle 106 including passenger capacity, luggage capacity, features (e.g. captain chairs, Wi-Fi, armored, and bar), other criteria; profitability (cost and distance function), driver ranking (using driver reviews from passengers), location proximity, client preference and client specific requirements, trip information, trip itinerary; the passenger's company's preferences. The system 100 offers the ride to the top-scoring driver 104 via the Driver App. The driver 104 can accept or reject the offer using the Driver App running on the driver user interface device 122. If the highest scoring driver 104 rejects the offer, the ride is offered to next highest scoring driver 104 and the process repeated until a driver 104 accepts the offer, shown at 508.

Figure 5A:
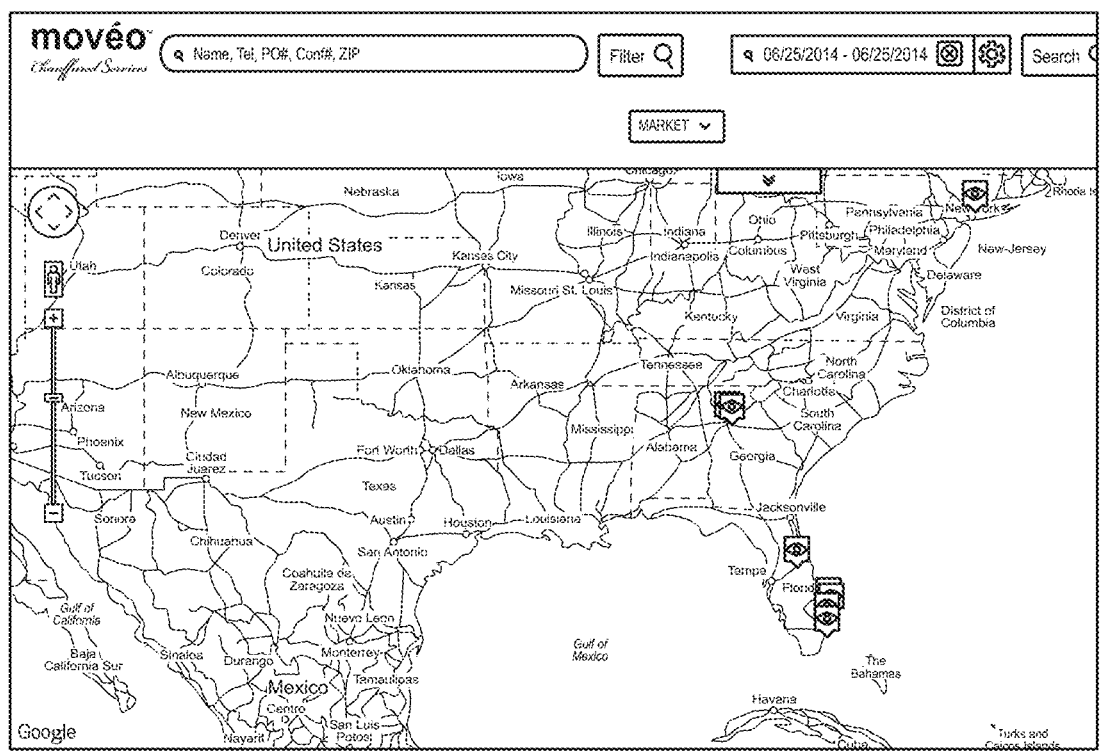
FIG. 5A illustrates an exemplary screenshot of the real time driver 104 and passenger 102 locations.
Figure 5B:
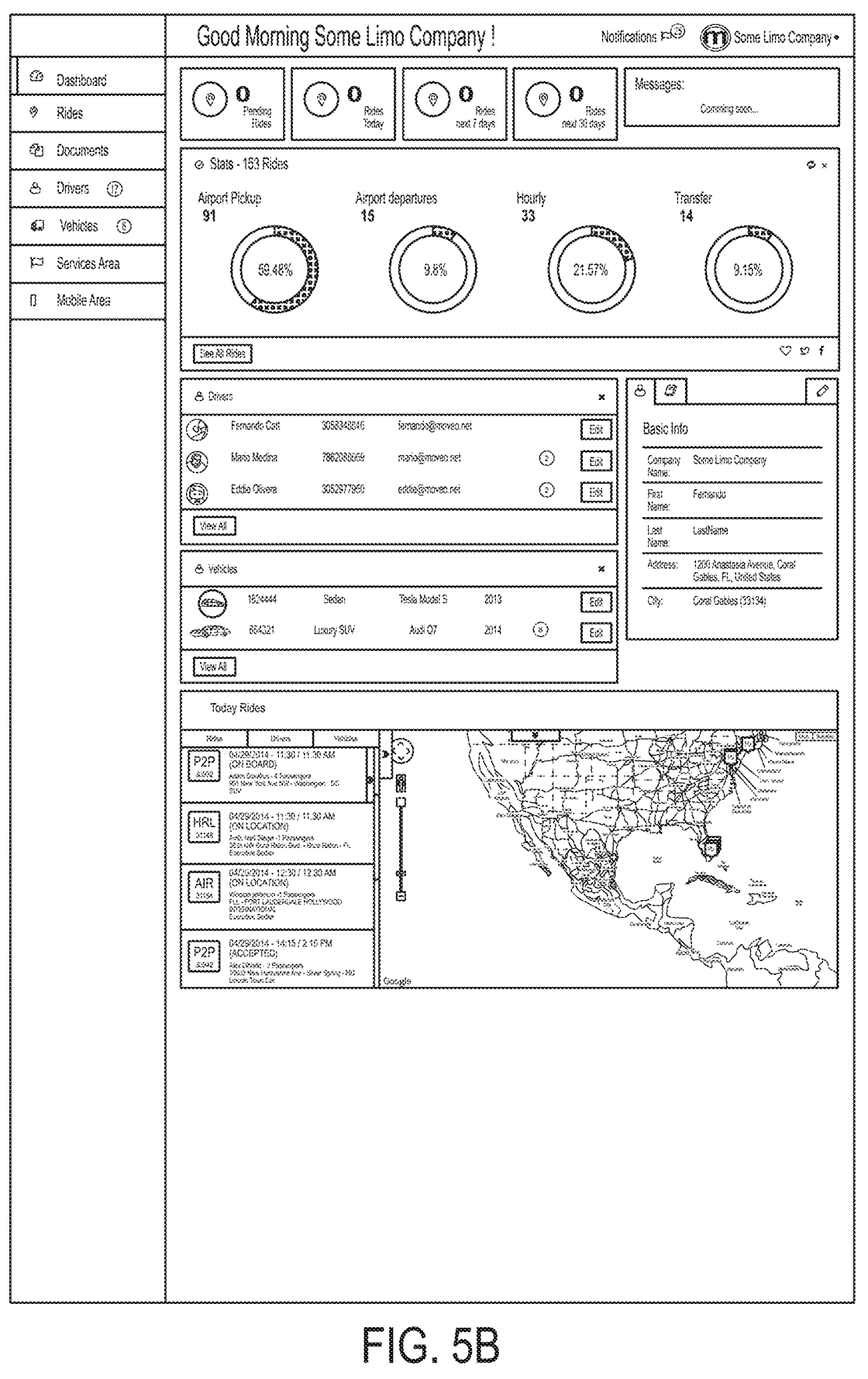

During the period from when a driver 104 accepts the ride offer until the driver 104 confirms that the driver 104 has embarked to fulfill the ride, OTW ("On The Way"), the system 100 performs checks at different time intervals to determine the probability that a driver 104 is still available to fulfill the ride. The current driver location with time stamp supplied from the Driver App is continually monitored by the system 100, along with timing factors such as weather, traffic, geolocation and other factors, to determine via geolocation that there is sufficient time for the driver 104 to move from the current location to the pickup location. An exemplary screenshot of the real time driver 104 and passenger 102 locations is shown in FIG. 5A.

If the Driver App is off, the system 100 generates a message that is sent via SMS or PNS (Push Notification) to prompt the driver 104 to turn the Driver App on. If the driver user interface device 122 is off, the system 100 generates an email that is sent to advise the driver 104 to keep the driver user interface device 122 turned on, shown at 510. If there is no response from the driver 104, the system 100 posts an alert notice with dispatch 160 for situational monitoring as the time for OTW gets closer. The system 100 will make a phone call (IVR)/SMS to the driver 104 to confirm the Driver App is on and that the driver 104 is OTW.

If there is insufficient time for a driver 104 to fulfill a ride the system 100 returns to the best driver matching routine using situational weights, for example, ones that reflect time urgency over non-critical passenger preferences, to offer the ride to another driver 104 that can meet the time constraints. The system 100 maintains a real-time table of probabilistic driver availability rankings for all drivers 104 in the network. If another driver 104 that can meet the time constraints accepts the ride, the system 100 notifies the existing driver 104 via the Drivers' App, SMS, or IVR that the ride is being transferred to another driver 104.

Every pickup time preferably has a fixed pre-OTW time that driver availability is checked by the system 100 and must be confirmed by the driver 104, for example, 2 hours before scheduled pickup. The system 100 first sends a request to confirm readiness via the Drivers App. If there is no response from the driver 104 then an SMS is sent advising the driver 104 to both turn on the Drivers App and respond to the readiness confirmation. If there is no response from the driver 104 then an IVR call is placed advising the driver 104 to both turn on the Drivers App and respond to the readiness confirmation. If there is no response from the driver 104 then the system 100 goes to the best driver matching routine described above to offer the ride to another driver 104.

The system 100 determines the best route, with alternatives, and delivers them to Driver App, shown at 512. The system 100 gathers real-time information on variables that affect rides, such as weather, construction, traffic accidents, flight delays, and other information, from at least one source, such as Google, Bing, MapQuest, weather.com, and other sites. An optimal route is sent to the Driver App and also pushed to the Passengers App to provide real-time updates for ETA to pick up, shown at 514. The system 100 provides real time ride update information, such as delays, location changes, time changes, and other information, to the Driver App and Passengers App and or changes the Bookers makes through the App.

The system 100 determines the best route in real-time pre-ride, and provides alternative routes if any events, such as traffic based, passenger changes, client changes for passengers, flight changes, or other, make the current best route significantly longer than a newly generated alternative route or the events require an alternative route. The newly generated route and/or re-route information is passed to the driver 104 via the Driver App, and updated ETA times for pickup from the existing route or the alternative route (re-optimized) are pushed to the Passenger App.

Ride 600

Figure 6A:
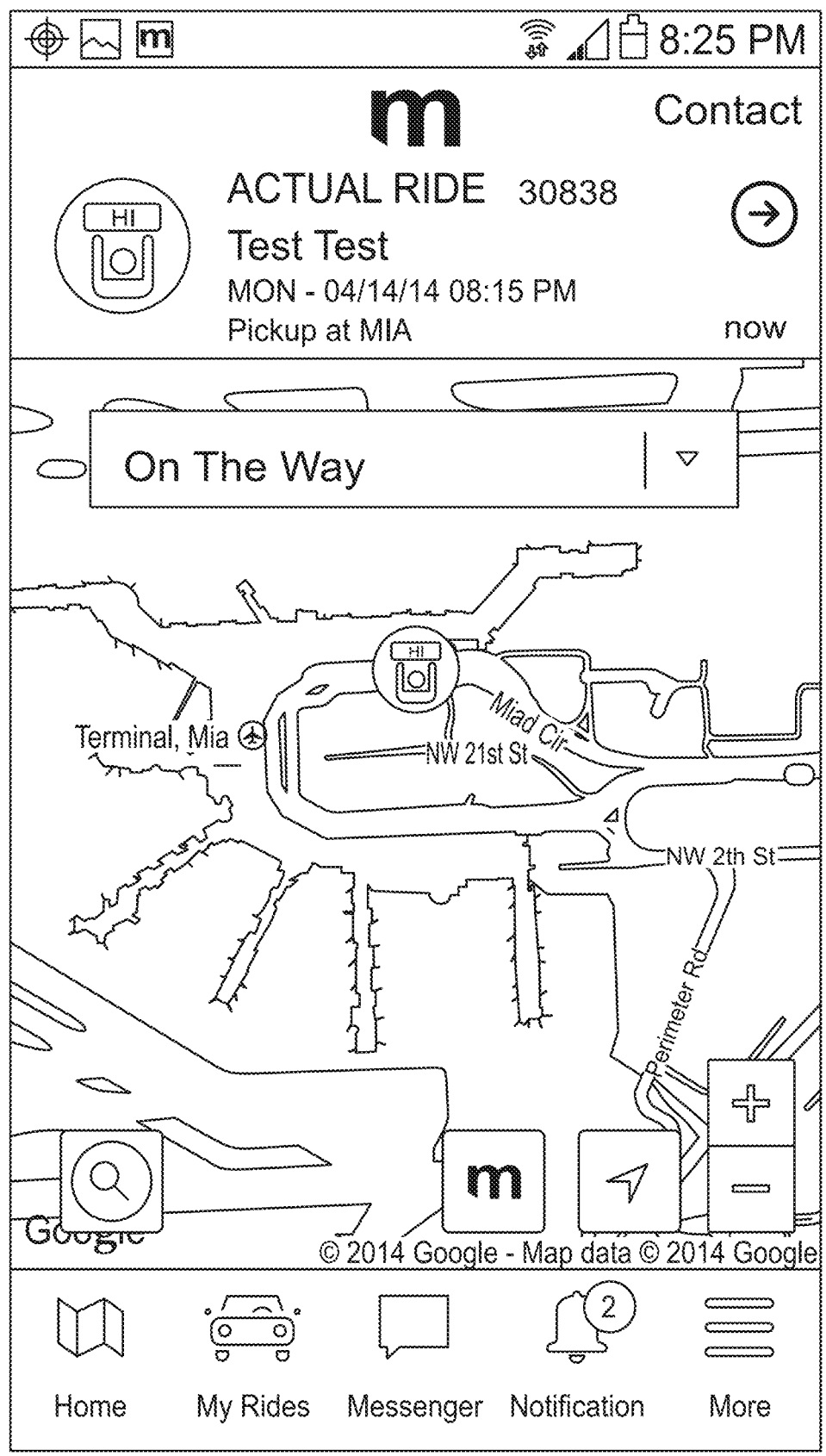
FIG. 6A illustrates an exemplary screenshot of OTW in the Driver App.

The system 100 confirms that the Drivers App is on, shown at 602, and that driver 104 is On The Way (OTW), shown at 604. This step assumes that the driver's pre-ride has been accepted, confirmed and that the driver 104 is available to be OTW. The driver 104 can tap the driver user interface device 122 with the Driver App to NFC/PSW chip to turn on the Driver App if the app is not on. The driver interface device 122 can be built into the vehicle 106. This can be referred to as NFC Action #1. An exemplary screenshot of the OTW is shown in FIG. 6A.

The driver 104 can confirm that the driver is OTW by using SMS, IVR or send a message via the Drivers App or tap the driver user interface device 122 with the Drivers App on the NFC/PSW chip in the vehicle 106. This can be referred to as NFC/PSW Action #2. After the Driver App is confirmed to be on, the system 100 can geo fence the driver's GPS location and determine that the driver 104 is OTW. The system 100 can send an SMS or Driver App message to request driver 104 to confirm OTW. The system 100 calculates the estimated time to pickup location (ETA), shown at 604.

The OTW information along with On Location, ETA, DropOff, or any ride event, can be shared to third parties (friends, coworkers etc.) by account holder, booker 162 and passenger 102 through the passenger app and VIP portal, shown at 610. This can be a simple notification or it could be a comprehensive app showing the entire ride, e.g. to an event coordinator.

Figure 6E:
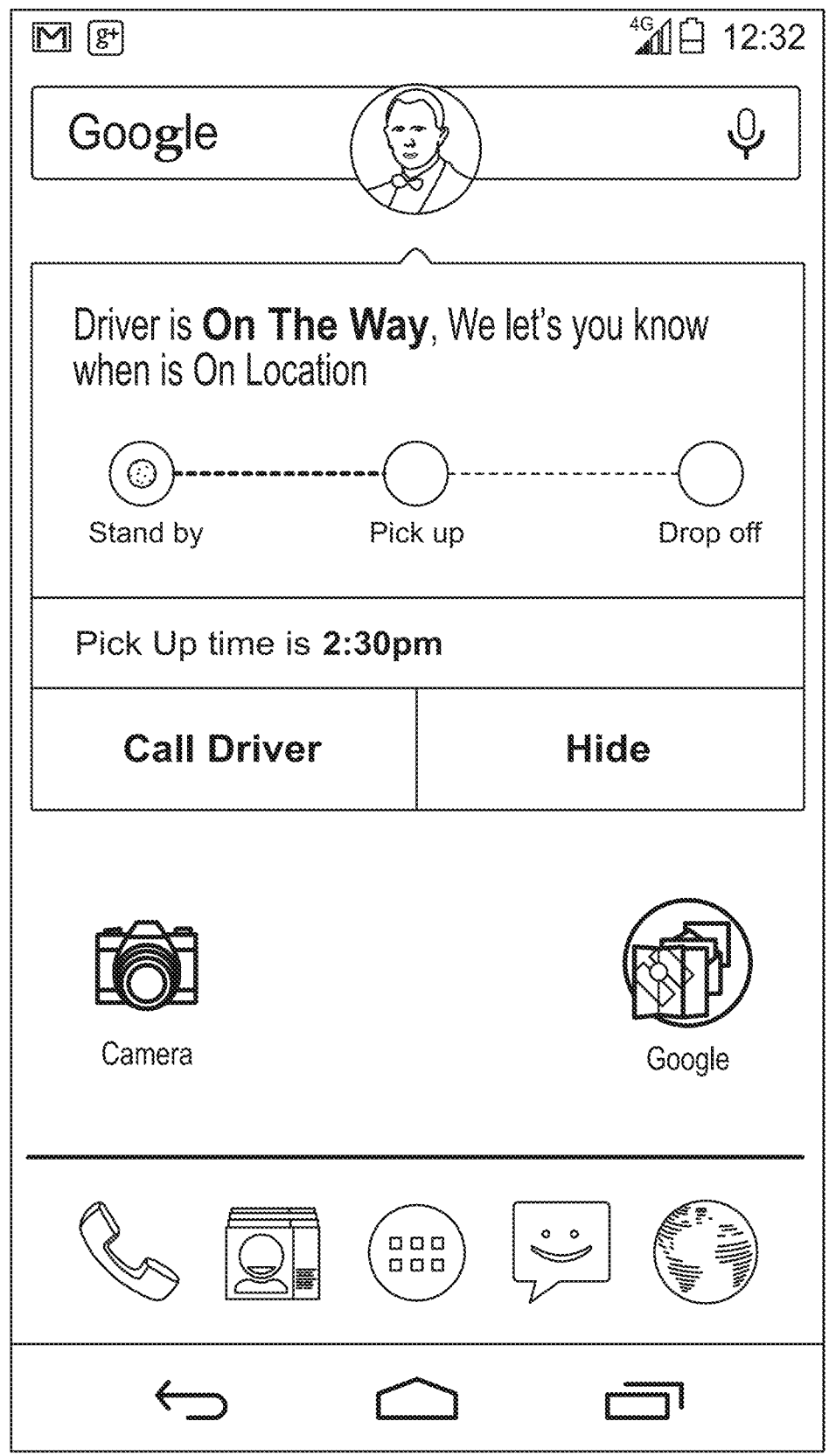
FIG. 6E illustrates an exemplary screenshot of an OTW notification in the Passenger App.

The system 100 can notify the account holder or booker 162 (can be passenger 102) that the driver 104 is on the way to pickup. An exemplary screenshot of the OTW notification in the Passenger App is shown in FIG. 6E. The system 100 can notify the passenger 102 via SMS, email or push notification to the Passenger App, that the driver 104 is OTW. The templates for this notification can be modified per market, occasion, service type, and client or country languages, and other factors.

The driver 104 can recall the Driver App by tapping the driver user interface device 122 with the Driver App to the NFC chip located on the driver's person or in the vehicle 106. This function can be referred to as NFC/PSW Action #6. An exemplary screenshot of the recall function in the Driver App is shown in FIG. 6B.

The system 100 can provide continuous analysis of driver's location. The system 100 can use dynamic width geo-fencing to determine if the driver 104 is on the correct route. Deviations from route can be managed by the system 100 via alerts to dispatch 160 and alerts to the driver 104, shown at 612. The system can calculate how far away a driver 104 is from the pickup location by using maximum speed limits from current location to points in the next 5, 10, 20 minutes then extrapolate pickup time. Similar calculations can be used to determine driver 104 time to any desired location, such as the drop-off location. This function allows the system 100 to reorganize an entire network fleet. For instance, if the fleet has three vehicles 106 at an airport and one vehicle 106 leaves, the system 100 could relocate another vehicle 106 at the airport. The system 100 can continuously monitor, evaluate and balance the fleet.

The continuous monitoring and analysis by the system 100 provides real-time 'Time to Pickup location' by traffic, weather, route, geo-fencing and other variables. The Real-time 'Time to Pickup Location' can passed to the driver 104 via the Driver App push notification or SMS and to the passenger 102 via the Passenger App push notification or SMS. Real-time 'Time to Pickup Location' can passed to the booker 162 (client, event Planner, or other) using Push Notification or SMS and to the passenger 102 via the Passenger App push notification or SMS.

The system 100 is preferably engineered with a two system (system with in a system) redundancy. The first system, which is the main system and is all components in system 100, managed the entire activity of all rides. The system 100 collects, contains, manages and distributes information necessary to manage both all rides collectively as well as provide that same information for specific rides issues. The management of specific rides is the explicit function of the second system, the Drivers App, which manages rides individually.

During the ride, circumstances may occur that require the driver 104 to notify the system 100 via dispatch 160 of a change, such as additional stops, delays, or other, or the system 100 may have to notify the driver 104 of a change, such as flight cancellation, ride cancellation, or other, shown 614. The system 100 manages these changes and impounds new information into the system 100, for example a flight delay that will make the driver 104 ineligible to be available for the next ride. An example of a screenshot of a notification of change is shown in FIG. 6C. The driver 104 can notify the system 100 that there is a change, such as passenger initiated (for example adding a stop, environmental, a traffic accident, or other) that would require deviation from the prescribed time and service for the ride by using the Driver App to enter details of every change. The system 100 can send a confirmation back to the Driver App along with any new instructions, such as cancellation of next ride or new ride instructions. The system 100 can determine a new route, such as based on deviations from initial route, driver changes, passenger changes, environmental changes, etc., and forward the new route to the driver app, shown at 616.

The system 100 can notify the driver 104 that there is a change, such as passenger initiated (for example adding a flight changes, environmental, a traffic accident, or other) that would require deviation from the defined time and service for the ride by sending to the driver 104 via the Driver App details of every change with any new instructions from the repercussions of the change, shown at 616. The Driver App can notify the system 100 as well. The client system (either the VIP portal or the Passenger App) can notify or be notified by the system, which is a full duplex process for notifying or being notified between 3 points. The driver 104 can confirm receipt of the notification and changes via the Driver App. All communications between the system 100 and the Driver App preferably require confirmation from the driver 104 by using SMS, Voice IVR, Driver App response message, or NFC/PSW tap (this function can be referred to as NFC/PSW Action #7).

Figure 6F:
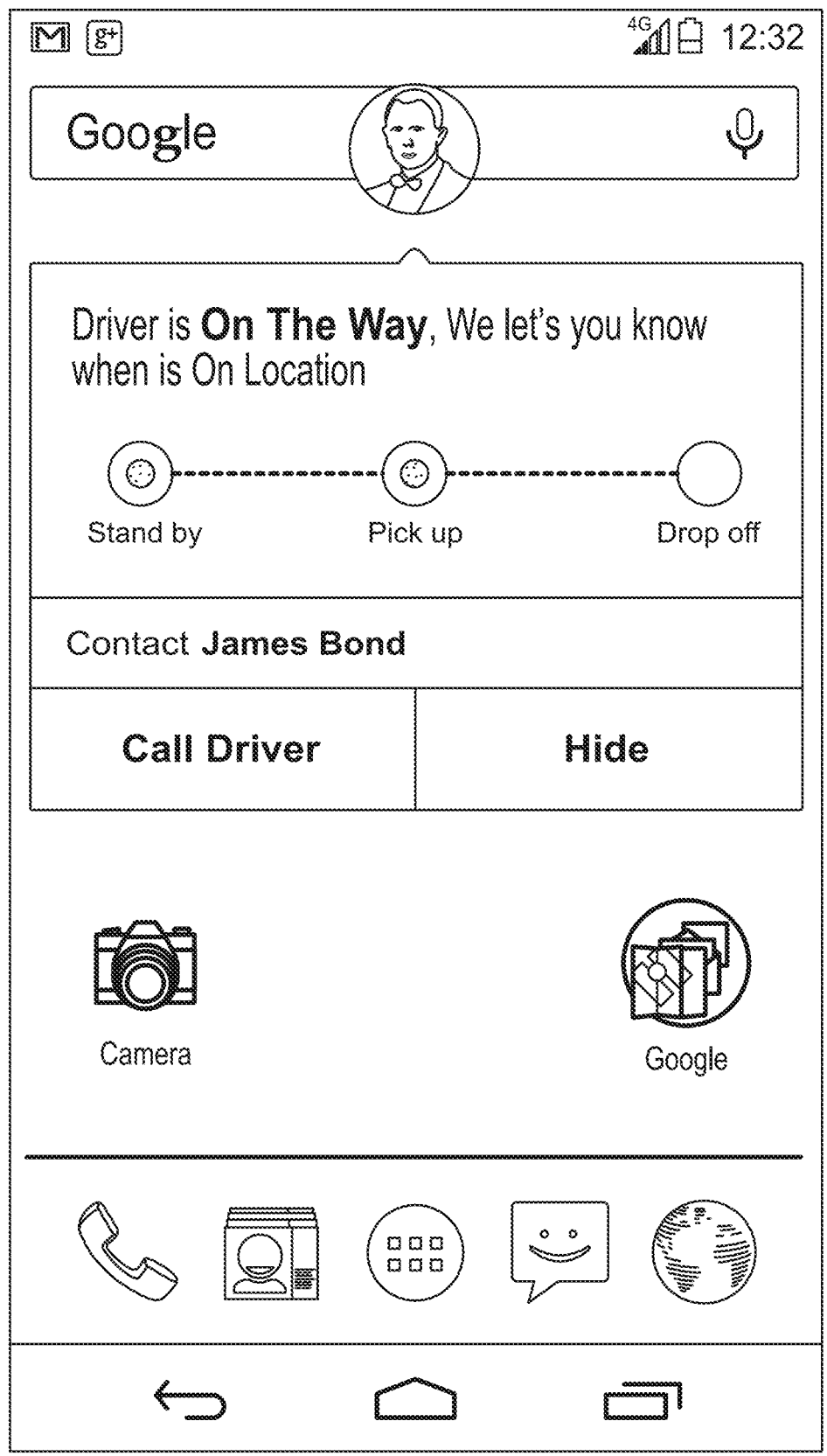
FIG. 6F illustrates an exemplary screenshot of a notification that driver is on location.

The system 100 can confirm that the driver 104 is on location. Driver 104 can contact the system 100 via SMS, IVR call, or Driver App notification or tapping the driver user interface device 122 with the Driver App on the NFC/PSW chip located in the car (NFC/PSW Action #3) to provide confirmation that the driver 104 is On Location. An example of a screenshot showing confirmation of driver location is shown in FIG. 6D. The system 100 can determine that the driver 104 is On Location via continuous geo fencing monitoring. If the driver 104 does not confirm On Location in a defined period the system 100 can send a message to the Driver App requesting the driver 104 to confirm On Location. An example of a screenshot showing a driver 104 is on location is shown in FIG. 6F

Passengers 102 and clients can communicate to the driver 104 if they need extra time. The system 100 will relay that information to the driver 104 and calculate waiting time charges. The system 100 can notify the Account Holder/Booker 102 that the driver 104 is on location. The system 100 can notify the passenger 102 via SMS, email or push notification to Passenger App that the driver 104 is on location. The notifications can be through any desired medium or protocol, such as through Driver, Passenger, Booker, Client, Account Holder, etc.

The system 100 One Number System ("ONS") allows all stakeholders, i.e. passenger 102, driver 104, Bookers 162, account holders, dispatch 160, corporate customers who need privacy control (for example event planners, corporate travel managers) and other participants to communicate without exposing their DID.

The system 100 can include a FMD as a function on the Passenger App that allows a passenger 102 to ping the driver 104 when the passenger 102 is searching for the driver 104 at a public pickup location, shown at 618. The FMD produces on the drivers user interface device 122 both an unique automated tone (branded tone), which can be heard when a passenger 102 is in proximity of the driver 104 and a sequence of lights using the screen and flash LED to assist the passenger 102 in identifying the driver 104. The automated tone can be unique for each ride, each passenger, or both as desired. The Passenger App can also display the GPS location of the driver 104 (along with a picture of the driver 104) through the Passengers App. Additionally, the system 100 can provide a progressively louder ping on the passenger user interface device 120 as the passenger 102 nears the driver 104.

The system 100 can use a microphone on the user interface device to capture ambient noise on both the passenger's and the driver's user interface devices 120, 122 the Find My Driver "FMD" function can match the sounds to add another layer of certainty that both the passenger's and driver's user interface devices 120 and 122 are in the same ambient location (room) or not, shown at 620. For example, using GPS, Bluetooth and 'Near Ultrasound' emissions from the passenger user interface device 120 the Driver Finds Passenger "DFP" can send the driver 104 a 'reverse' ping when the driver 104 is in proximity of the passenger 102.

Figure 6G:
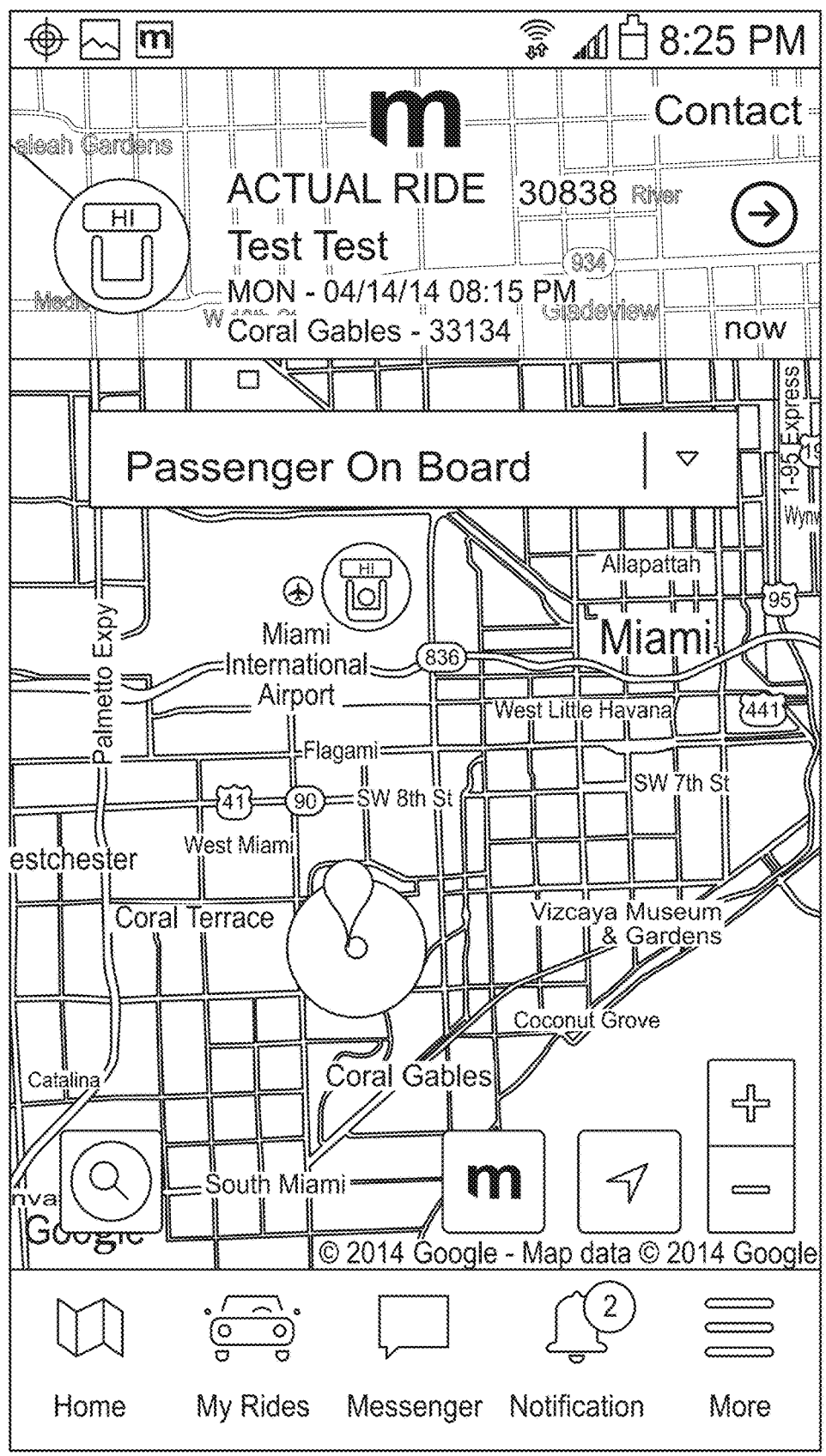
FIG. 6G illustrates an exemplary screenshot of a passenger confirmation.

The system 100 can confirm that passenger 102 is onboard the vehicle 106 and when the passenger 102 has been dropped off. An exemplary screenshot of the passenger confirmation is shown in FIG. 6G. The driver 104 can confirm to the system 100 that the passenger 102 On-Board the vehicle 106 by using SMS, IVR or sending a message via the Driver App or tapping the driver user interface device 122 with the Driver App on the NFC/PSW chip in the vehicle 106, which can be referred to as NFC/PSW Action #4.

The system 100 can use the microphone on the user interface devices to capture ambient noise on both the passenger's and the driver's user interface devices 120, 122. The systems FMD function can match the sounds to add another layer of certainty that both passenger and driver user interface devices 120 and 122 are in the same ambient location (room) or not.

Figure 6H:
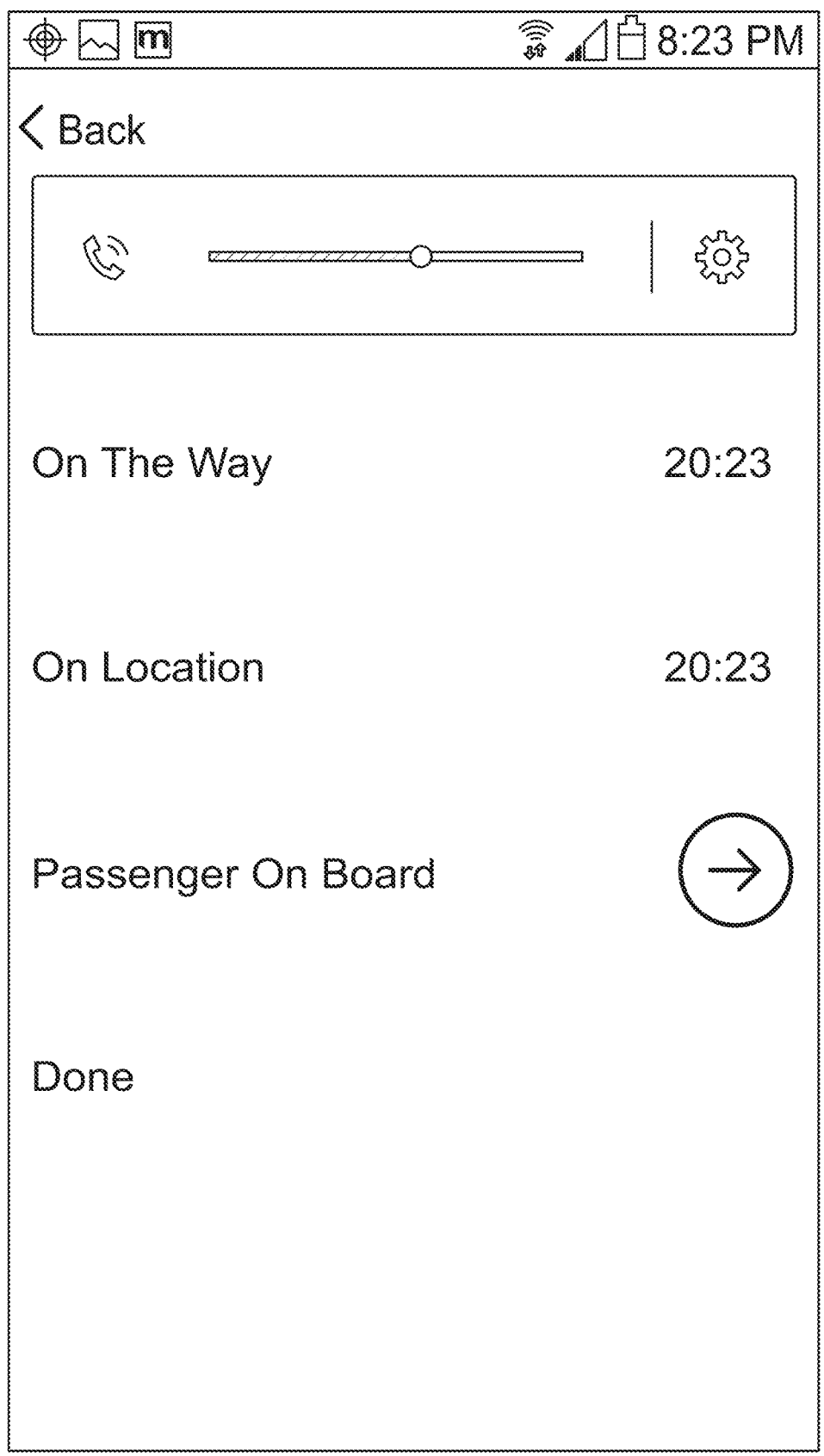
FIG. 6H illustrates an exemplary screenshot of a ride complete confirmation.

The driver can confirm to the system 100 that the driver 104 has successfully completed the ride with passenger 102 Drop-Off by using SMS, IVR or sending a message via the Driver App or tapping the driver user interface 122 with the Driver App on the NFC chip in the vehicle 106, which can be referred to as NFC/PSW Action #5. An exemplary screenshot of ride complete confirmation is shown in FIG. 6H.

The system 100 can notify the account holder and/or booker 162 via SMS, email or push notification sent to the Passenger App, shown at 624. Account holders and bookers 162 can receive these notifications, such as that the driver 104 is with the passenger 102, on the Passenger App provided that the account holder has profiled the passenger 102, using the client portal, to manage passengers 102.

Though an approved credit card is preferably required to book a ride, there are times when a credit card may still need to be authorized during the ride, shown at 622. In addition first time users who booked over the Internet are preferably required to present the credit card in order to prevent unauthorized use (chargeback prevention). The driver 104 can take a picture the driver user interface device 122 and the Driver App forwards the image to the system 100 and deletes the image from the driver user interface device 122. The driver user interface device 122 and Driver App can include a mag-stripe and chip (EMS) card reader function that provides secure capture to approve credit card transactions during the ride. Other functions can include OCR capture, magstripe capture, or signature capture for information.

For rides that are hourly where a preset number of hours are authorized and/or paid for by the client/accountholder/passenger, the system 100 can detect from geo location, traffic info, or other, when the amount is exceeded and the system 100 can authorize additional changes on the card and alert the driver 104 to obtain approval from passenger 102.

Post-Ride 700

The system 100 confirms that the driver 104 is no longer with the passenger 102, i.e. the passenger 102 has been dropped off at the drop-off location, shown at 702. This confirmation can be conducted by using a microphone on the user interface devices 120, 122 to capture ambient noise on both the passenger user interface device 122 and the driver user interface device to match the ambient sounds to add another layer of certainty that both user interface devices 120, 122 are not in the same ambient location. Other methods of determining the proximity between the driver 104 and passenger 102 can be used as desired, such as geolocation of the driver and passenger user interface devices 120, 122, or a generated signal. The proximity between the driver 104 and passenger 102 is preferably confirmed by at least two different methods.

The system 100 can notify the booker 162 that the passenger 104 has been dropped off, shown at 704. A time stamp, the geo location of Drop Off, and a mini map web page can be generated by the system 100 that highlights changes, such as by changing the color and/or Icon to show current status. This screen can be referred to as Global View (which is also referred to as God's View) map of all the booker's passengers. A report or recap of the ride to the booker 162 and account holder can be generated by the system 100 and emailed or printed from Global View.

Figure 7A:
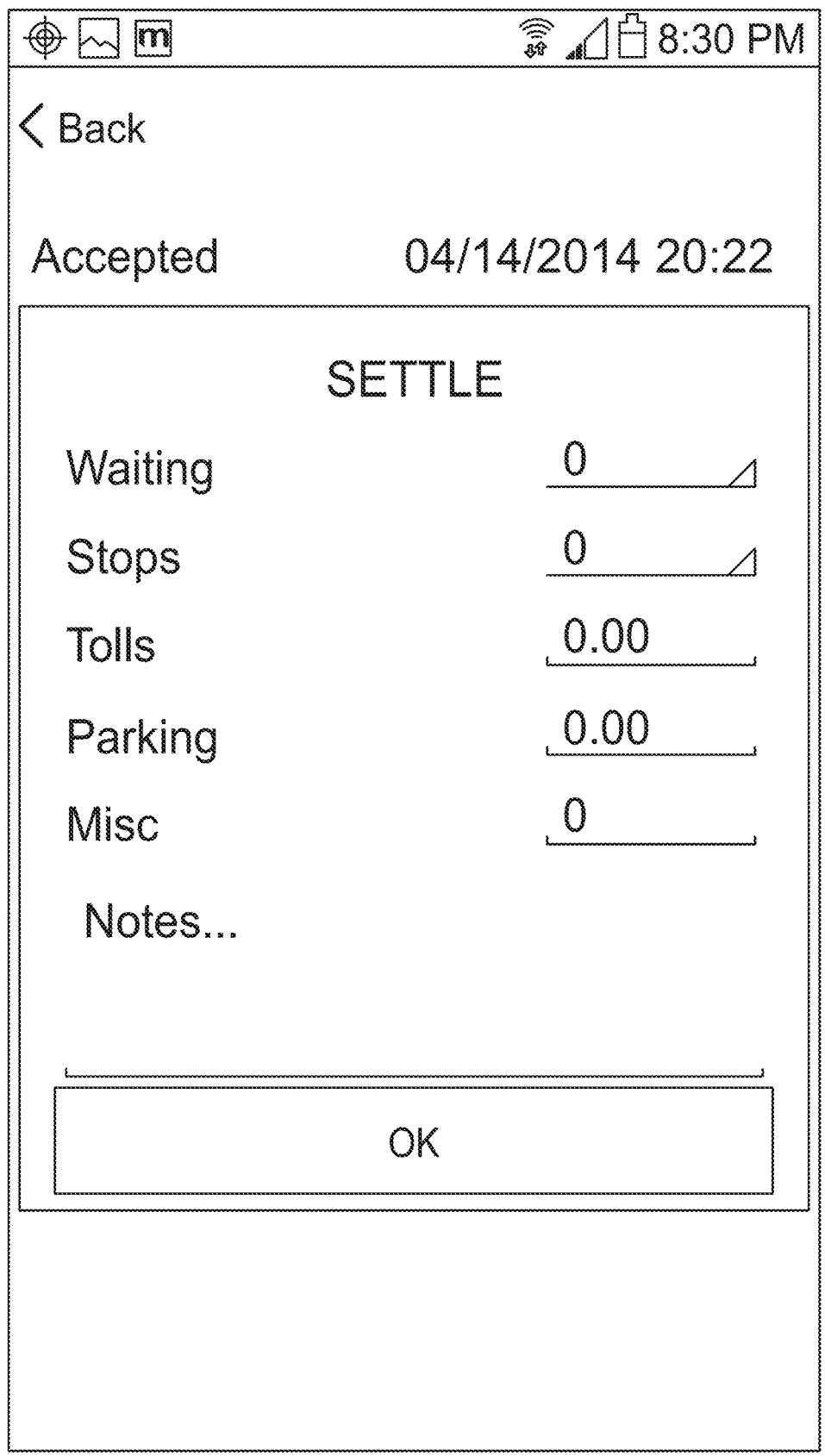
FIG. 7A illustrates an exemplary screenshot a drop off notification in Global View.

The system 100 can notify the account holder via SMS, email or push notification through the Passenger App that the passenger 102 has been dropped off, shown at 704. A time stamp, the geo location of drop off, and a mini map web page can be provided that identifies the current status, such as changing color and/or Icon to show the status. An exemplary screenshot of a drop off notification in Global View is shown in FIG. 7A.

Figure 7B:
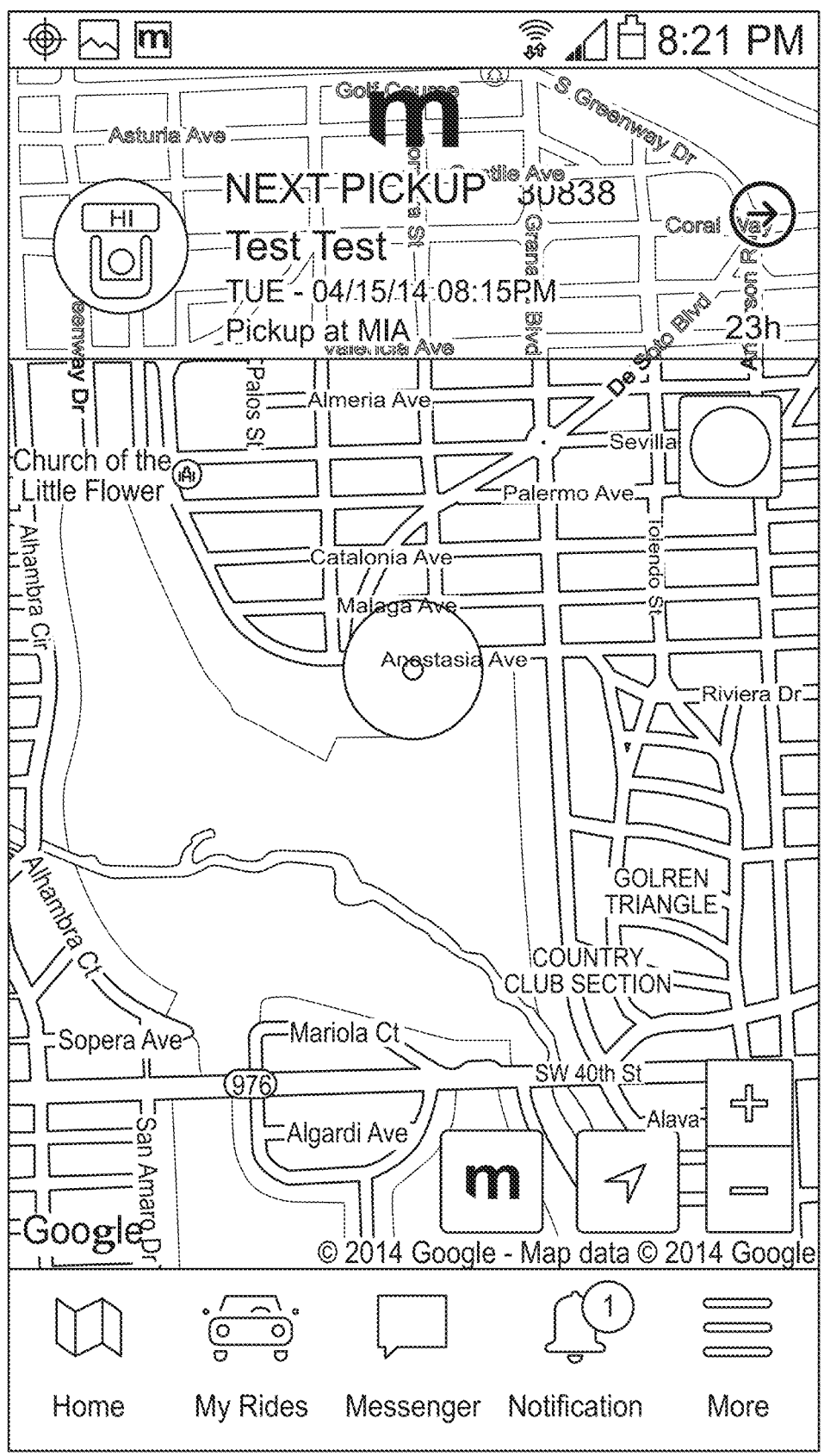
FIG. 7B illustrates an exemplary screenshot of settlement.

The system 100 can automate the settlement process so that all ride information including changes are collected and collated. An exemplary screenshot of settlement is shown in FIG. 7B.

Once the ride is complete, the system 100 can change the status of the driver 104 to "Available" (for other passengers) and the available driver 104 can be matched with a passenger 102 using the matching algorithm, shown at 708. The availability of the driver can be displayed as an icon in Global View and/or the Passenger App and/or Driver App.

Once the driver 104 has entered Drop-off or Done Status into the Driver App, the system 100 allows a preset time window, such as 2 hours from Drop Off confirmation, for the driver 104 to provide any additional closeout information in the Driver App, shown at 716. An example of where the driver 104 can enter the additional closeout information is shown in the screenshot of FIG. 7B. A ride close out in the Driver App allows drivers to input additional ride information that impacts the final bill, such as additional stops, tolls, parking, wait time, other extra services and general notes. The system 100 can automate the data collection for the driver 104, such as GPS geo-fencing to establish tolls paid or parking fees paid. The system 100 can pass the final schedule of services consumed, which may not include pricing, directly to the customer and/or passenger 102 via the Passenger App and the Client Portal for the Customer/Passenger to confirm.

Figure 7C:
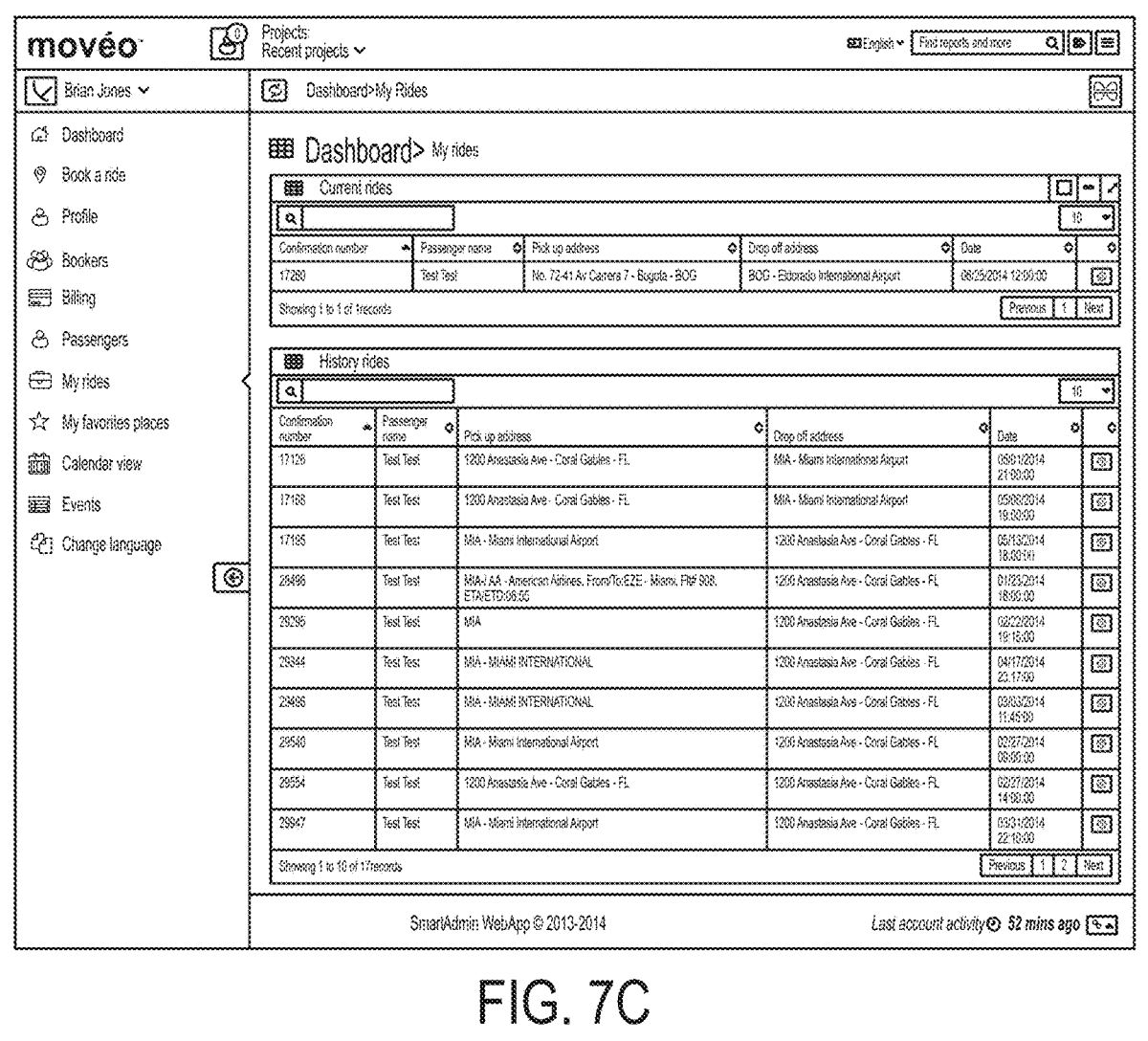

The system 100 allow the passenger 102 to close out the ride using a ride closeout, shown at 710. The account holder receives the final schedule of services generated by the system 100 for confirmation and can accept or question any services rendered via the Passenger App and/or the Client Portal. An exemplary screenshot of the passenger closeout is shown in FIG. 7C.

Figure 7D:
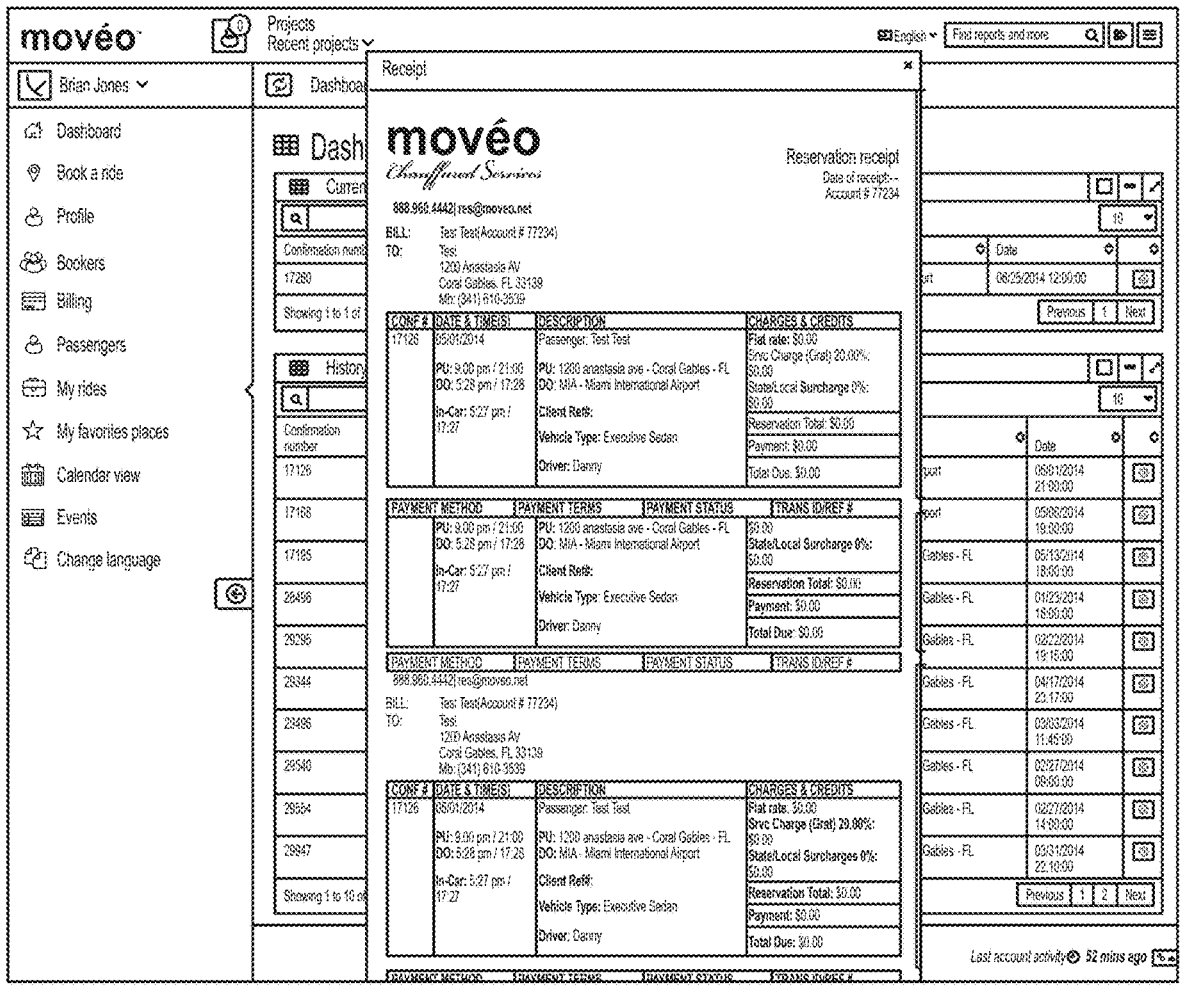
FIG. 7D illustrates an exemplary screenshot of a receipt for the ride.

Once services are accepted, the final invoice is sent by the system 100 to the Passenger App and/or the client portal, shown at 714. Once the final invoice is sent the card-on-file is charged or invoice is sent to customer's billing department. An example of the receipt for the ride is shown in FIG. 7D.

The system 100 can pay the driver 104 by sending payment to the driver's account with the Ride ID, shown at 706. For example, settled rides can be paid out to the driver 104 weekly onto a prepaid debit card issued to each driver. In this manner, no physical checks are required to be picked up, i.e. fully automated with no human intervention. Notification of payment, transferred as a deposit on to the credit card, is sent via SMS, PNS (push notification) and/or email.

Figure 7E:
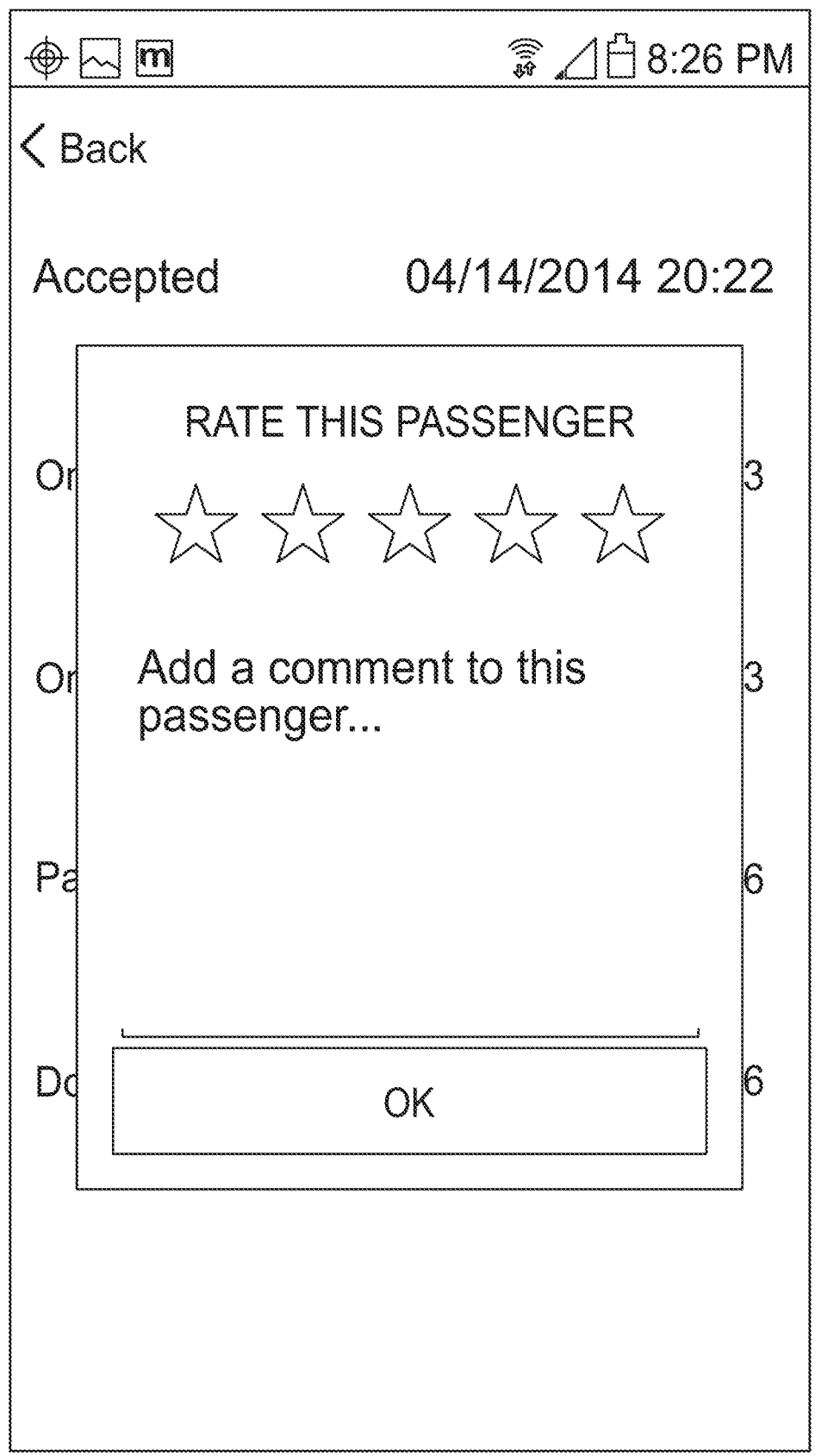
FIG. 7E illustrates an exemplary screenshot of rating a passenger 102.
Figure 7F:
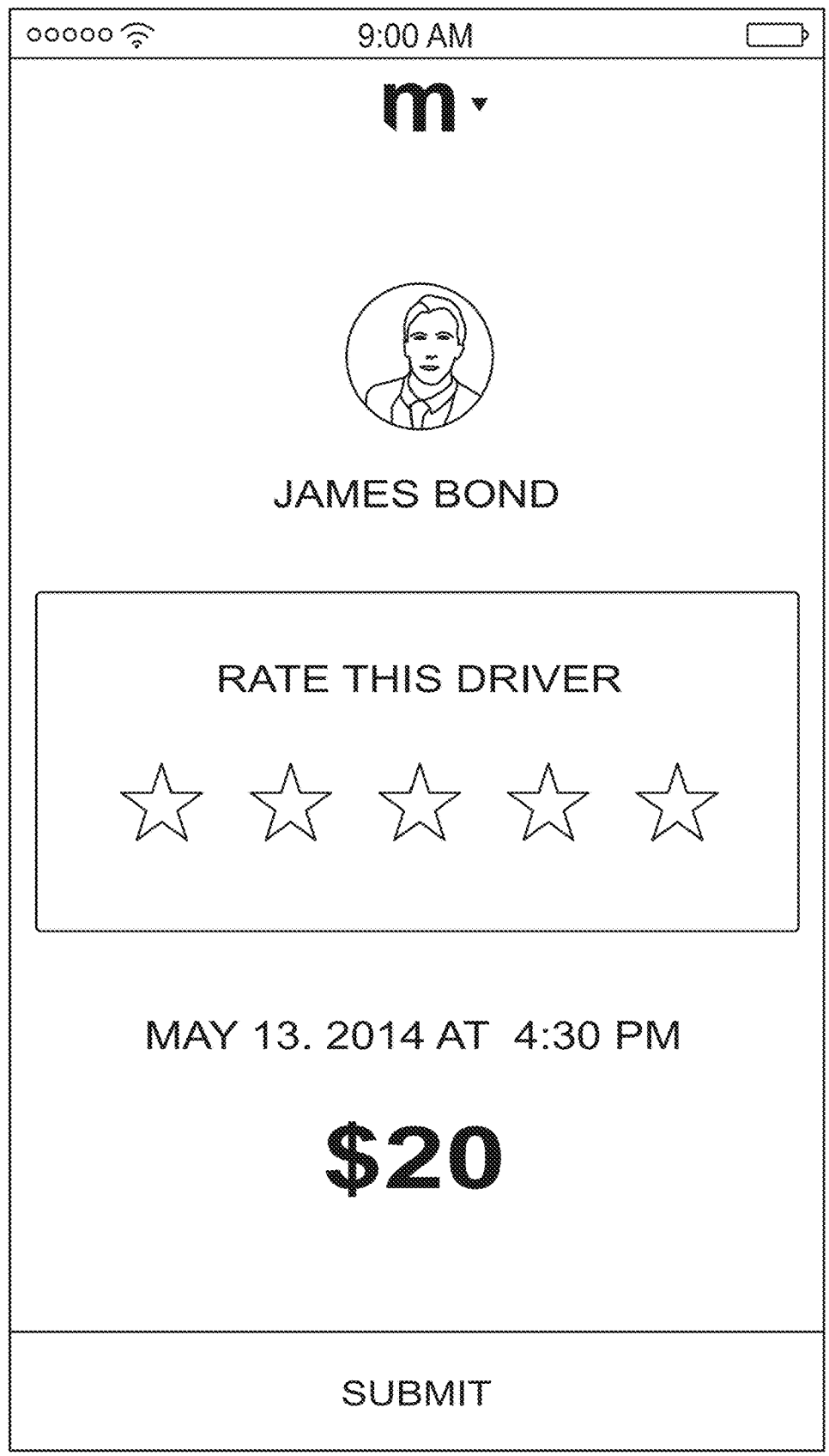
FIG. 7F illustrates an exemplary screenshot of rating a driver 104.

The system 100 has a detailed rating system that allows drivers 104, passengers 102 and the company (through collected data) to rate the driver 104, ride and passenger 102. The Driver App and Passenger App allow the driver 102 and passenger 102 to rate each other, shown at 712 and 718. An exemplary screenshot of a rating the passenger 102 is shown in FIG. 7E. An exemplary screenshot of a rating the driver 104 is shown in FIG. 7F. The passenger 102 can also rate the vehicle 106 and the overall ride.

The system 100 can collect numerous ride data points that effect the driver's ranking in the system 100. Each data point can be provided with a dynamic weight. For example, the weight can be higher or lower depending on ranking use within the system 100. Data points include, but are not limited to: driver reject/accept ratio; driver cancellation/fulfilled Ride ratio; driving habits, g-forces maneuvers, exceeding posted speed limits, reckless driving, and other information is collected via the Driver App using the driver user interface device 122 hardware (for example a smartphone equipped with gyroscope, accelerometer, etc.). This information can also be collected by the passenger user interface device 120. This information can be collected both when the driver 104 has a passenger 102 on board and when the driver 104 is driving without a passenger 102 on board. The data can be marked as such for relative weighting in the ranking systems. Additional data points include, but are not limited to: OTW timeliness—early/late ratio; spot times—early/late ratio; passenger ratings (can be automatically entered into ranking system); charge dispute ratio (disputes/no disputes); vehicle age; driver motor vehicle history (accidents, citations); and dispatcher 160 live person intervention ratio. The system 100 can also collect data from the driver user interface device 122 while the driver 104 is not on duty.

At the end of the ride, the system 100 can generate a final message to the customer using variables from the ride, such as: passenger's status (i.e. does not have App yet), the type of ride, special dates (birthdays, anniversaries), and ride chronology (i.e. drop off at airport on first leg of trip). The final message can offer the opportunity to share the experience with social media, such as Facebook, Twitter, etc. The final message can be the final function, after settlement and ranking, and interaction for a ride. Some examples of additional information that can be included in the final message can be: Promo—offer to gift a ride for downloading the app; Upsell—offer to pick up the passenger 102 at the destination airport; Upsell armored vehicle; Upsell luxury vehicle; Upsell body guard companion; and Share—send message to friends by tapping into their contacts. Information can be shared or distributed or monitored by Account Holder, Booker, Client, or other, instead of just the passenger 102.

Passenger App

The passenger 102 can download the Passenger App that is suitable for the passenger user interface device 120 being used, for example android or iPhone, from the system 100 and install the app on the passenger user interface device 120. The Passenger App can capture social media apps, emails, phone numbers, address book data (e.g. contacts), location (through triangulation if GPS is not on), carrier, phone manufacturer and OS, other apps, language, country (i.e. for time zone), IP address, and other personal data, shown at 518. The Passenger App can capture and log other applications installed, uninstalled and running on the passenger user interface device 120. The data can be used for profiling on the Passenger App and for corporate use. The Passenger App can send a text message to verify phone number and personal data. For example, the system 100 can send a code for verification and the code can become a password to log into the system 100. The system 100 parses the database to gather previous ride information regarding the passenger 102 and to match the number and email for verification. The account can be populated if the passenger 102 is confirmed as the account holder. If the account is not confirmed, the system 100 requests information including, but not limited to, picture, credit card, and/or signature to setup an account. The customer has the option to abandon this process at anytime and to begin a booking search as a guest.

Figure 8A:
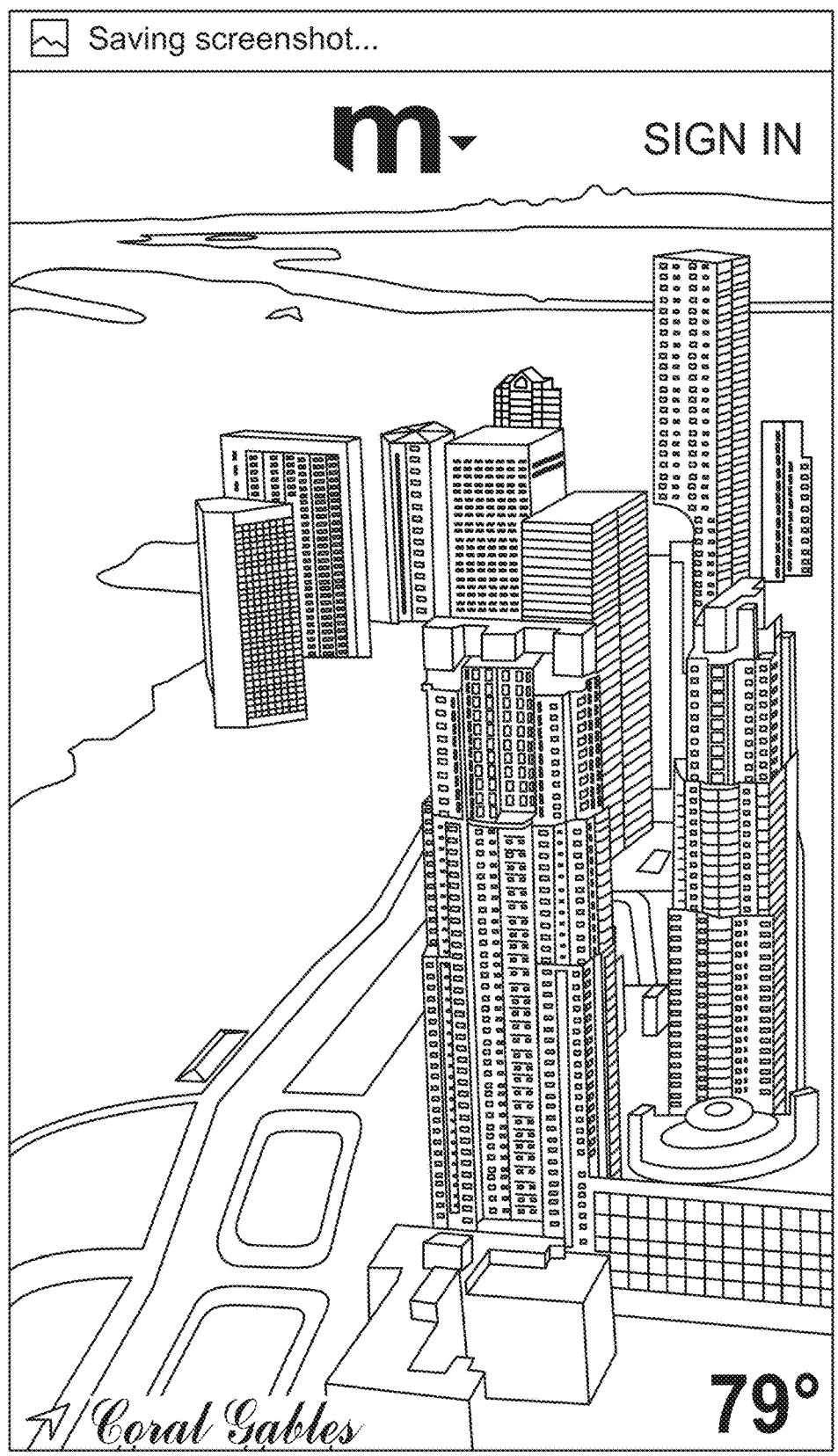
FIG. 8A illustrates an exemplary screenshot of a home page.
Figure 8B:
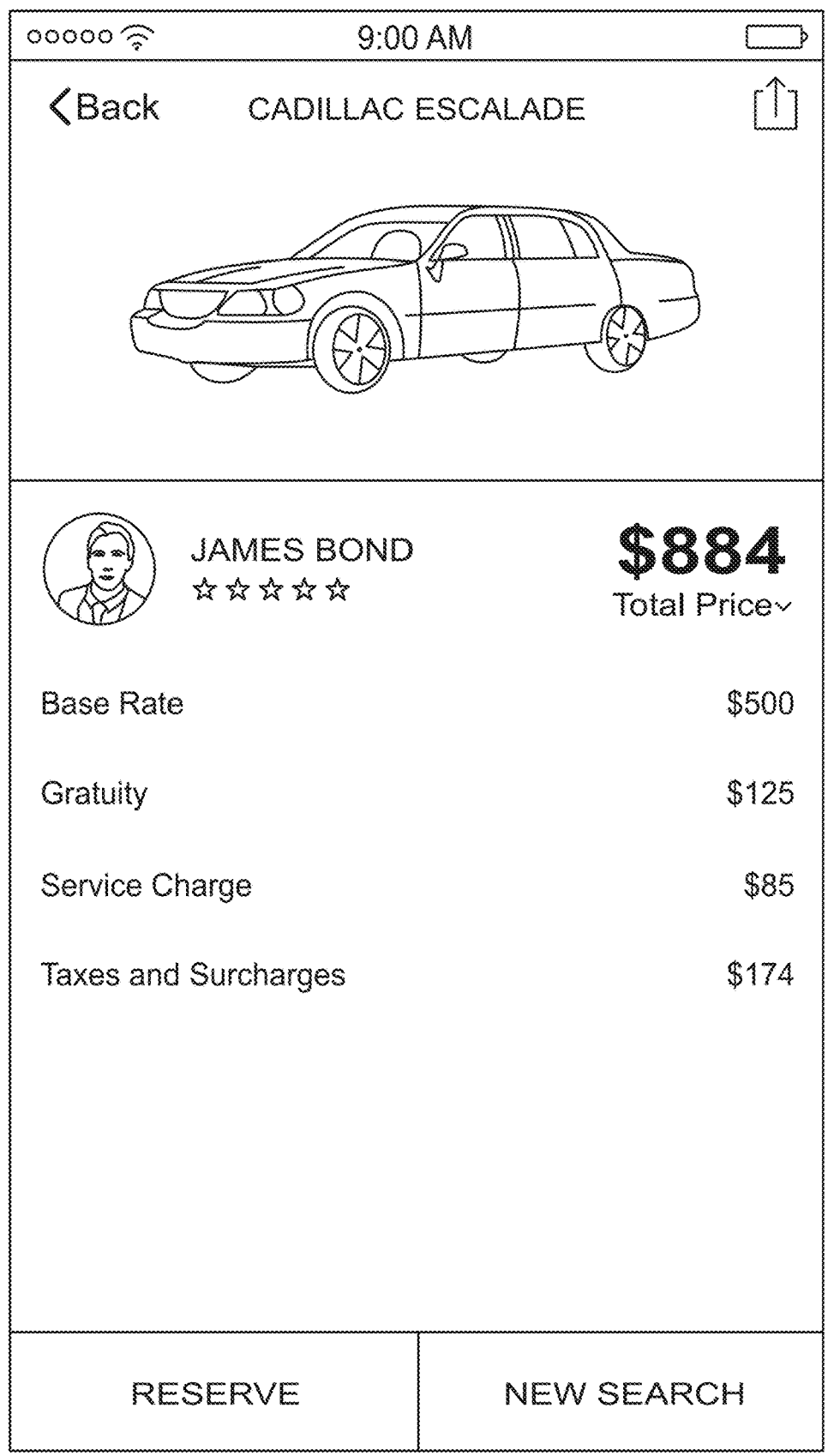
FIG. 8B illustrates an exemplary screenshot of driver ratings.
Figure 8C:
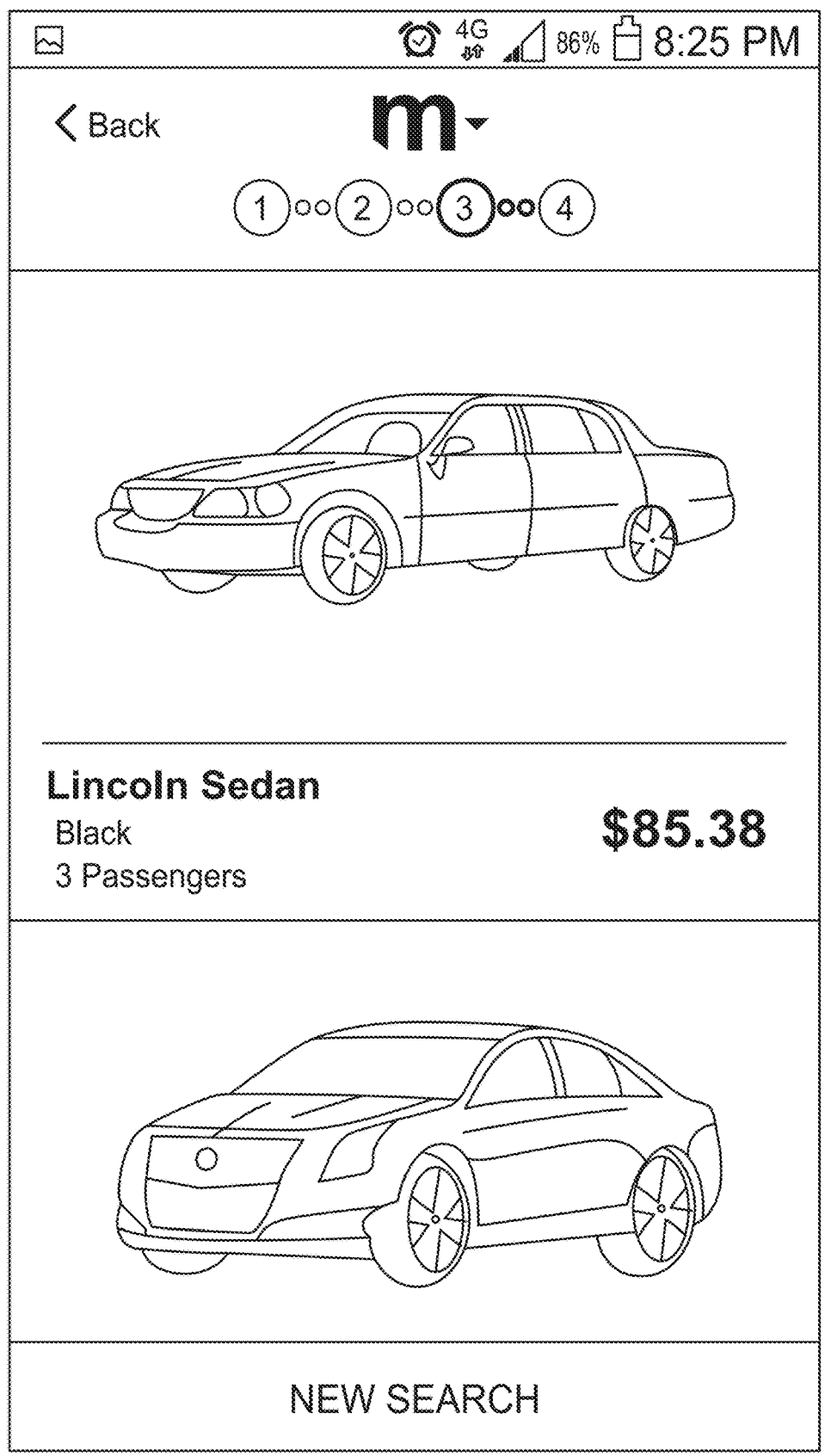
FIG. 8C illustrates an exemplary screenshot of a booking page.

The system 100 can post confirmed rides are on a home page. An example of the home page is shown in the exemplary screenshot of FIG. 8A. The system 100 can post previous rides on a past rides page. Invite to try the system 100 with promotional codes (referrals) and links and tools can be sent by the system to social media apps. The system 100 can request a series of random questions each time an app is opened to know more about the passenger 102, such as language spoken, travel places, etc. The system 100 can provide the ability to communicate with dispatcher 160 and driver 104 for current rides by any suitable medium, such as a user interface device, stationary telephone, computer, SMS, PNS, email, or other The system 100 can display driver 104 ratings. An exemplary screenshot showing driver ratings is provided in FIG. 8B. The system 100 also can display driver (amenities and vehicle 106) preferences The system 100 can also display a driver availability page for ASAP rides (includes vehicle 106, driver 104 and amenities, and can be generated from preferences). The passenger 102 can select a driver 104 for pickup, such as within 15 minutes. The system 100 can display a notification of driver availability (initiates on no Drivers Available or User configured future time). An exemplary screenshot of a booking page is shown in FIG. 8C.

Figure 8D:
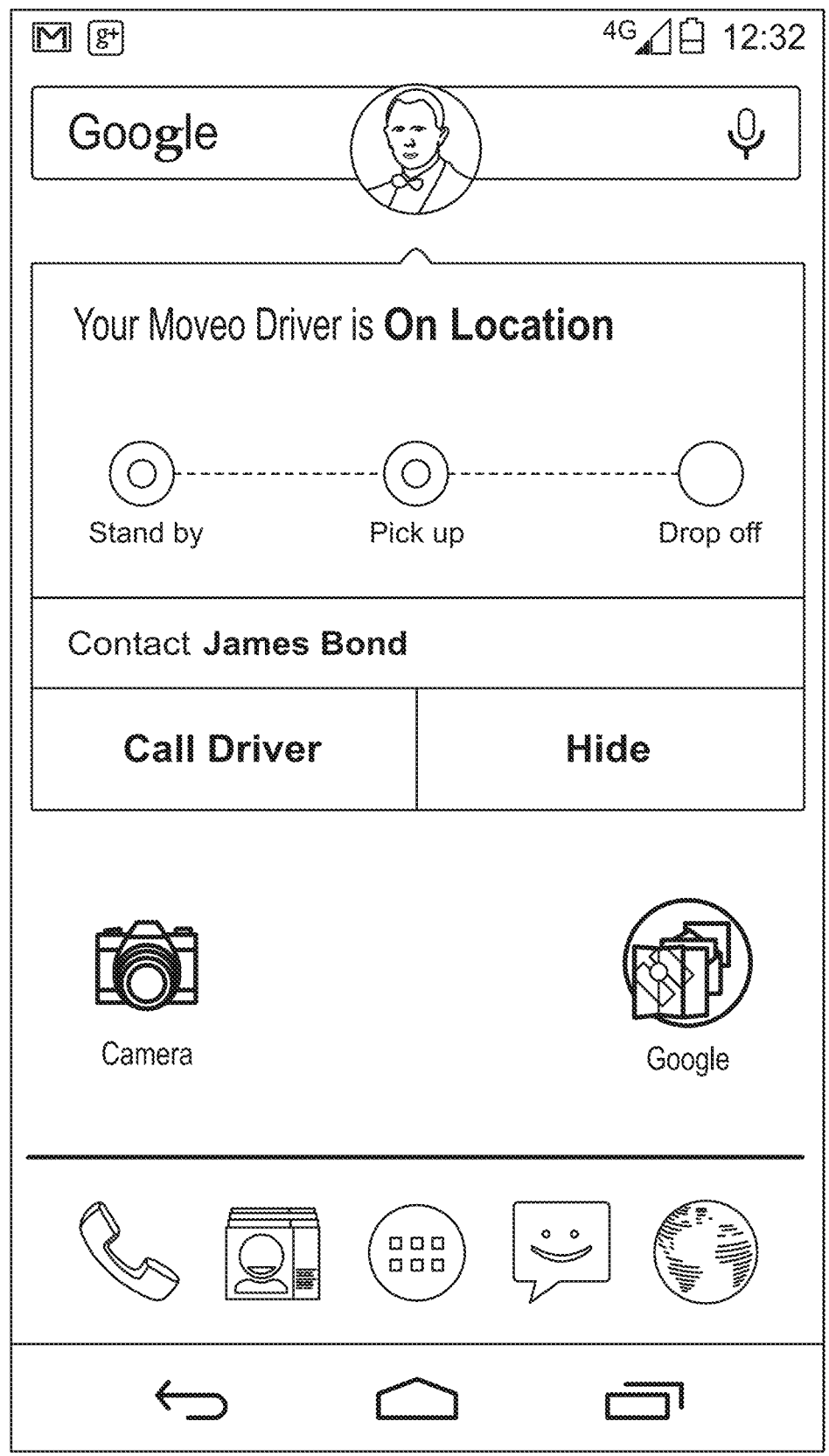
FIG. 8D illustrates an exemplary screenshot of a driver status page.

The system 100 can also provide the following pages: dynamic offers page (generated from passenger interaction on internet sites or applications, such as Hotwire or Kayak; social media sharing throughout the App at selected locations; discounts and special offers page; and bookers page to see status of all rides with all passengers that they are a booker for. An exemplary screenshot showing the status of the driver 104 is shown in FIG. 8D.

Driver App

Figure 9A:
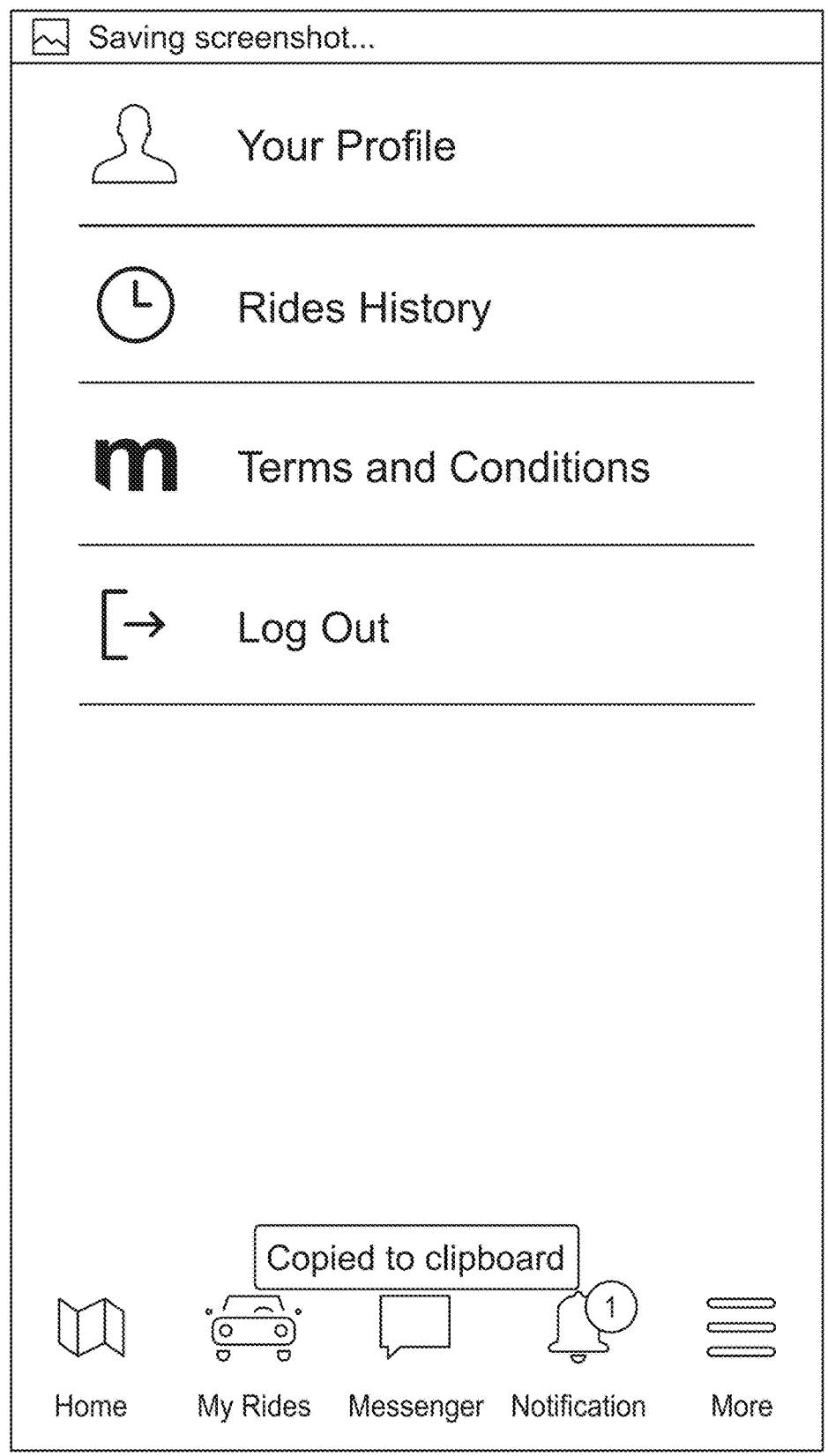
FIG. 9A illustrates an exemplary screenshot of driver rides history.

The driver 104 can download the Driver App that is suitable for the driver user interface device 122 being used, for example android or iPhone, from the system 100. The Driver App can capture and log other applications installed, uninstalled and on the driver user interface device 122. This data can be used for profiling on the Driver App and for corporate use. The Driver App can be set to block all competitors' applications, for example Uber, GroundLink, or other, during the time that the Driver App is running on the driver user interface device 122. The Driver App can capture social media apps, emails, phone numbers, address book data, such as contacts, location, for example through triangulation if GPS is not on, carrier, phone manufacturer and OS, other apps, language, country, time zone, and other personalization data. The system 100 can generate a text message to verify phone number and other personal data. The system 100 can parse database to determine entities in the address book is related to the company running the system 100, for example, drivers passengers, bookers, travel agents, concierges, or other. The system 100 can search a phone number determine past rides supplied to the company running the system 100. An exemplary screenshot showing rides history is shown in FIG. 9A.

Figure 9B:
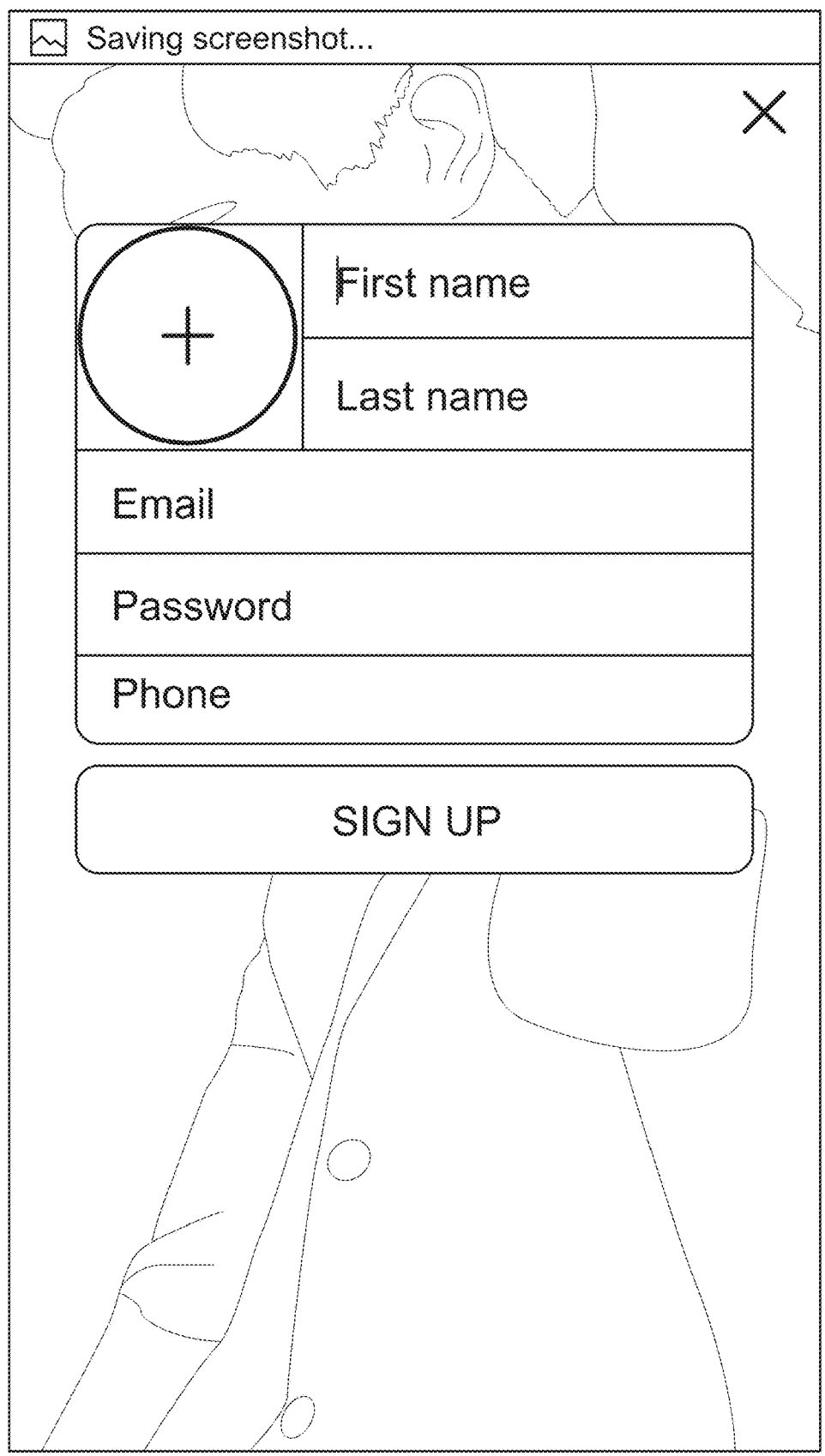
FIG. 9B illustrates an exemplary screenshot of a driver's portal.
Figure 9C:
FIG. 9C illustrates an exemplary screenshot of upcoming rides.

The system 100 conducts a matching process to determine the partners the driver 104 works with. The system 100 can allow the driver to login only if the driver 104 is registered in the driver's portal, for example, login credentials are provided upon approval in driver's portal. An exemplary screen shot of the driver's portal is shown in FIG. 9B. The system 100 can provide a past rides page and an upcoming rides page. An exemplary screenshot of an upcoming rides is shown in FIG. 9C. The Driver App can display a marketplace page for available rides in the future, which can be displayed based on driver ranking, vehicle 106, or other criteria.

Figure 9D:
FIG. 9D illustrates an exemplary screenshot to accept or reject rides.
Figure 9E:
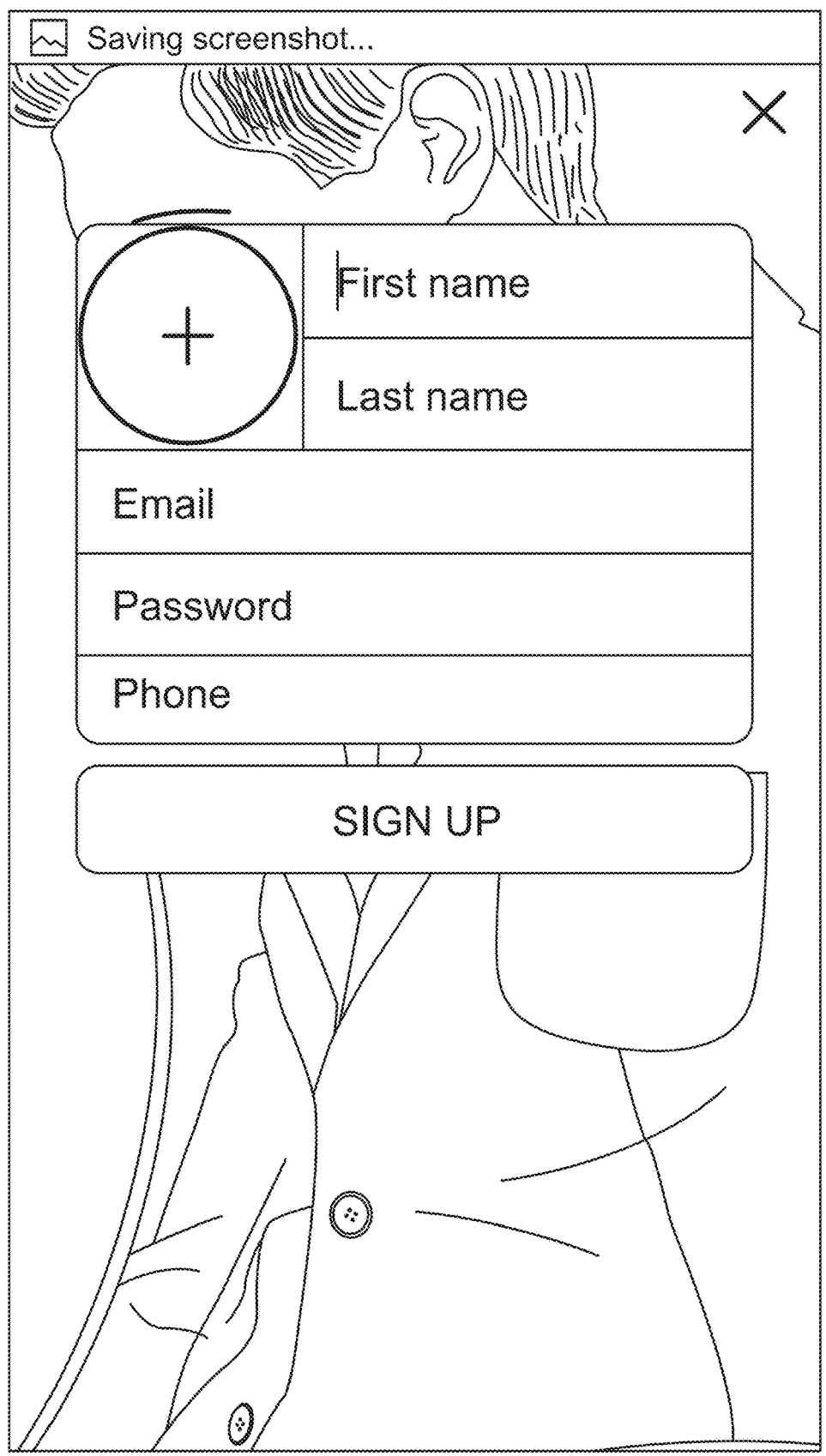
FIG. 9E illustrates an exemplary screenshot to invite other drivers.
Figure 9F:
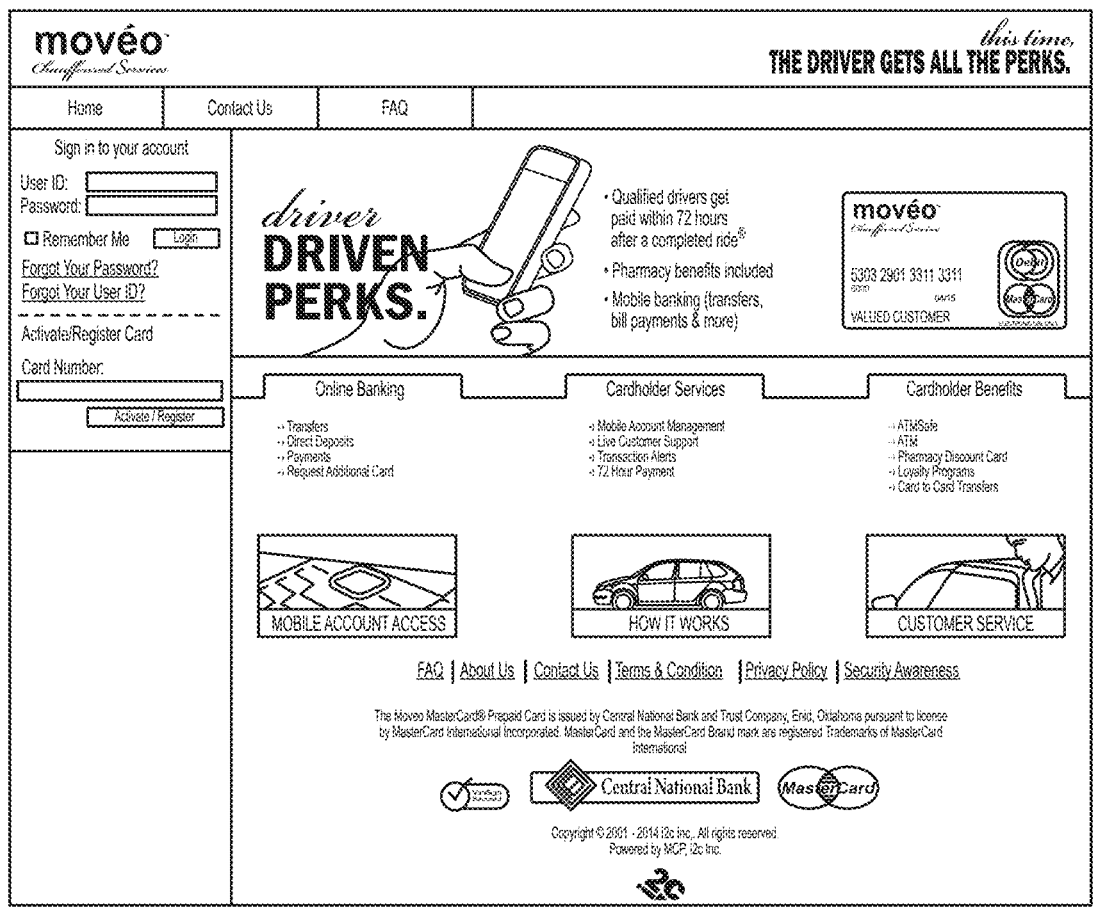
FIG. 9F illustrates an exemplary screenshot to register for a company credit card.

The system 100 can provide an 'as soon as possible' (ASAP) page for the driver 104 to accept short-term rides, which can be turned or on based on availability. An exemplary screenshot of a ride offer page to accept or reject rides is shown in FIG. 9D. An exemplary screenshot of an invite other drivers page (Promos and Specials) is shown in FIG. 9E. An exemplary screenshot of a register for 'movéomoney' MasterCard is shown in FIG. 9F.

At a high level the present invention differs from prior art 'on-demand' services (as offered by Uber, Hailo and others) in the context that preferably all of the present inventions 'bookings' are 'Pre-Arranged'. A fundamental difference at a more granular level between the prior art and the present invention's standard booking process is that the 'Spot'* time and the Pickup time are dynamic for ASAP. That is the ASAP can be set by the system 100 by factoring variables and external conditions for both the client (does not have to be the passenger) and the drivers 104 in the vicinity of the passenger 102 who is requesting the ASAP service or having the ASAP service requested for. This is in contrast to explicit (stated and fixed) Spot and Pickup times, which are part of the 'hard' booking data for pre-arranged. The difference then between an On-demand booking and an ASAP booking is that there is no Spot or Pickup time for On-Demand, it is best efforts for both. Whereas, the system 100 will book the ASAP ride and dynamically create then communicate to all parties (i.e. Passengers, Bookers, Clients, Account Holders, etc.) the Spot and Pickup times, which can be the same or different under ASAP, but not for Pre-Arranged. Note that the On-Location estimated time of arrival (ETA) for an ASAP ride once it is booked can fluctuate due to traffic, weather and other external factors. The system 100 can update all parties via the various Apps and Portals. Spot time is the amount of time before Pickup and specifies to drivers 104 where they must be 'On-Location'. Occasionally customers can request a specific spot time.

Figure 9H:
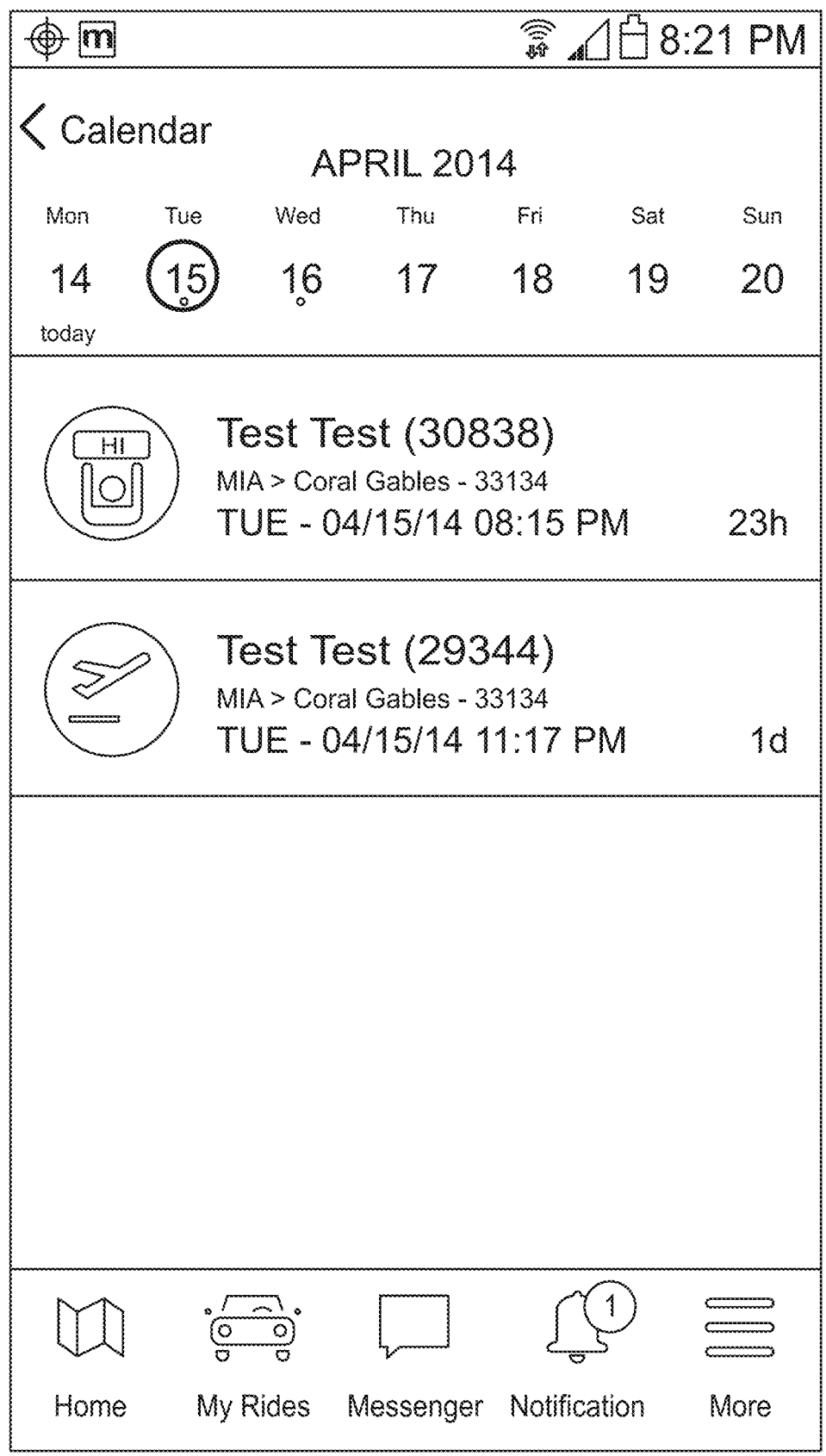
FIG. 9H illustrates an exemplary screenshot to review past ride.

The system 100 can invite the user to download the Driver App and receive gift a ride/upgrade and incentivize drivers 104 to obtain non-app clients to download the Passenger App (e.g. by invitation only). The Driver App can provide the following pages: Card balances page; Flight data page; Traffic page for best routes; Settlement page (see Post Ride section), and exemplary screenshot of the Settlement page is shown in FIG. 9G; Past ride review Page, and exemplary screenshot of the Past ride review page is shown in FIG. 9H; Passenger Ranking Page; and Random Questions page provide to profile the driver 104.

The Driver App preferably uses a vehicle in a safe way (e.g. hands-free) for the driver 104 to communicate with the system. For example, the Driver App can use NFC/PSW while a driver 104 is in the vehicle to communicate to the dispatch 160 without the need for voice or texting. This meets the hands free requirements legislated in most states. As a far less intrusive means of communicating it yields a better passenger experience.

The following actions provide notification to the dispatch 160 which confirms and logs each action: Tap to Open; Invoke or Recall the Drivers App first command upon departing to pickup location, but can be done anytime during the ride; Tap to accept a Ride Offer during the ride offers may come in and a single tap accepts and notifies dispatch; Tap to notify dispatch that Driver is "On-The-Way" upon departing for pickup locations; Tap for "On-Location" when at pickup location—dispatch confirms with GPS; Tap for "Passenger-on-Board"; and Tap for "Passenger-Drop Off".

Algorithm Examples

In the algorithm example, the weights for listed variables (also referred to as parameters) can be dynamically adjusted as desired for the particular application by the system 100. For example, booker preferences can be weighted, and then these booker preference weights can be used by the system 100 to dynamically adjust the weight(s) of the variables, which is referred to as dynamic weighting. For example, the system can initially weight a newer car over an older car. The booker can enter a booker preference to weight a specific type of car as being more important (higher weight) than whether a car is newer. This would yield a new weighting (dynamic) that would more heavily weight type over age. Weights can be on any number of variables including: specific price, driver, time, or any other desired variable. The system 100 will account for the booker preference weight(s) and dynamically adjust the weight(s) in real time. The variable weights can be interrelated so that changing one weight can change other weights. While not preferred, each of the weights can be statically adjusted if desired as well.

Best Driver (Non-ASAP Rides)

An embodiment of the Best Driver feature of System 100 uses an algorithm that evaluates two series of variables to determine the best possible driver for the ride requested. The first set of variables resolve as gating values, in that any "no" removes that 'Driver' from the evaluation list of possible drivers, and is set aside for further iteration should the algorithm pass yield no available Drivers. The second set of variables input into the algorithm as weighted values. Each variable is weighted by value factors, which are totaled by the algorithm to yield a ranking of Drivers in the algorithm output. Once the system 100 selects a series of variables as viable driver options, the algorithm will send the best driver options in order to the system 100. The system 100 then requests availability via the Drivers App and the Drivers Portal starting with the best driver option first.

Example—All Pre-Arranged Rides

Once the algorithm running in system 100 has narrowed down possible drivers from, for example, 1,000 drivers to 20 drivers using 'Gating Variables', the algorithm analyzes a series of weighted variables as qualified driver options. The Best Driver algorithm will request availability in sequence of best option; first based on the weighted factor/quality score (if account holder), or by cost (if not an account holder). Depending how far the pickup time is from this process, the system 100 will send out a driver request(s) individually or in batches. For example, if the ride is within 8 hours, the system 100 will broadcast to all the options at once and wait for an ACCEPT or REJECT. A driver 104 that accepts first will be assigned to the ride requested. If the ride is 4 days away or more, the system will send the ride request to a single driver 104 from top preference to bottom and iterate REJECTS until either an ACCEPT Is received or there is less than 8 hours till pick up time where all drivers 104 are broadcast, including drivers 104 who previously REJECTED and may not be available.

Example Run—On-Demand Rides (ASAP Modification)

ASAP rides can additionally show available drivers 104 within a set radius from the passengers 102 location. Fewer Gating and Weighted Variables are presented to the passenger 102, but the passenger (or booker 162) may select any vehicle 106 they choose. Vehicle general specifications and ETA will be shown to the driver 104. Once the passenger 102 selects the vehicle 106, the driver has 15 seconds to confirm and head to the PU location. At this time, the driver information is displayed to the passenger 102 and ETA updates.

TABLE 1

| # | Gating Variables | Output Value | Comment or Example |
|---|---|---|---|
| 1 | Market set up | YES/NO | Ride in Miami will not be sent to an Atlanta driver |
| 2 | Ride proximity | YES/NO | How far is PickUp from Base Location |
| 3 | Vehicle Passenger Capacity | YES/NO | How many passengers are being picked up |
| 4 | Vehicle Luggage Requirements | YES/NO | Customer parameter |
| 5 | Current Driver Availability | YES/NO | Data from movéo rides schedules |
| 6 | Handicap Accessible | YES/NO | Customer parameter |
| 7 | Document Expirations | YES/NO | Real-time document check - insurance, Licenses, etc. |
| 8 | Specific Equipment Availability | YES/NO | e.g. Child Seat, Cooler, Wi-Fi, etc. |

TABLE 1-continued

| | | | |
|---|---|---|---|
| 9+ | Other Gating Variables | YES/NO | Customer parameter, or 'force majeure' parameters |

| # | Weighted Variables | Output Value | Comment or Example |
|---|---|---|---|
| 1 | Vehicle Relevance | Weight | Customer preference (ranking of age, model, etc.) |
| 2 | Seniority | Weight | Driver seniority |
| 3 | Accept to Reject Ratio | Weight | From database of Drivers activity |
| 4 | Cost Factor | Weight | From customer profiles/preferences land database info |
| 5 | Single IO/Multi-vehicle IO | Weight | |
| 6 | Driver behavior score | Weight | From collected data on driver |
| 7 | Vehicle Age | Weight | |
| 8 | Insurance Coverage | Weight | e.g. limit amount (customer profile/preference) |
| 9 | Incident Count | Weight | From collected driver data |
| 10 | Passenger Driver Rating | Weight | Passenger ratings of individual drivers |
| 11 | Driver Requests | Weight | Customer profile/preferences |
| 12 | Upgrade/Downgrade | Weight | Frequent rider benefits |
| 13+ | Other Weighted Variables | Weight | |

Booking

An embodiment of the Booking algorithm, which initiates the dispatching process in the system 100, uses various parameters to determine the best ride options available to a booker—algorithm outputs show best vehicle, availability and pricing. Using the variables below the Booking algorithm checks rules and limitations based on various types of service. These include:

a). routing variables (latitude and longitude) to determine market and inventory availability;

b). date and time variables to determine availability and special pricing within a market; and c). location of booking will define if the booker is local to the search or from outside the market.

The system 100 will search online from other booking sites via an API to reference and will book with an additional predetermined margin and conditions of service, in markets where the system 100 does not have fixed driver prices as the default price.

Variables can be parsed through the pricing engine and a final price is automatically set and passed to the booker 162. Variables that are booker preferences can limit options, e.g. passenger count will determine logical vehicle options available based on seating capacity.

Additional services, (e.g. stops) or equipment, (e.g. car seats) can be requested at time of booking that are added to the final price. Final pricing is also adjusted by other information historical data, availability, inventory or events. The Booking algorithm adjusts pricing to all variables to optimize ride count by offering the most competitive price to fill inventory and manage availability when inventory runs scarce.

TABLE 2

| # | Variables | Comment or Example |
|---|---|---|
| 1 | Type of Service | Ex.: Transfers/Hourly |
| 2 | Date | May, 12, 2014 |
| 3 | Time | 9:30 am |

TABLE 2-continued

| # | Variables | Comment or Example |
|---|---|---|
| 4 | Passenger Count | 2 |
| 5 | Routing Information | PU/DO/STOP etc. |
| 6 | Location of booking/IP | Booker location by IP search |
| 7 | Other Customer Preferences | Luggage, Child Seat Etc. |
| 8 | Other Information | Historical data, events, demand, inventory etc. |

Routing

An embodiment of the Routing algorithm is a component of ride management for system 100. Management of inventory (available drivers), optimization of inventory (driver efficiency), and passenger satisfaction are some of the dependencies that the Routing algorithm provides data for in the dispatch process of system 100. The Routing algorithm produces routes in advance during reservation. This data is provided to system 100 as part of the input data for other algorithms (e.g. Best Driver), inventory management and other dispatch functions. The system 100 determines best route to the booker 162 during booking and once the passenger 102 is on board, then to the next routing location. Function continues until the passenger 102 is dropped off and ride has been completed, with the exception that ASAP is only real-time. The route calculation process can utilize third-party routing systems, e.g. Google, through API integrations, where the system 100 algorithm passes data to these third party systems. Output data is continually passed to other system 100 roles, e.g. Drivers Portal, Global View (God's View), Client Portal, etc. for processing in those modules functions.

TABLE 3

| # | Variables | Comments |
|---|---|---|
| 1 | Time | Rush Hour vs. Off Peak |
| 2 | Date | Weekend vs. Weekday |
| 3 | Routing Information | Location |
| 4 | Weather Conditions | Alerts from 3rd party API |
| 5 | Traffic Conditions | Alerts from 3rd party API |
| 6 | Driving Profile | Avg. Driving speed of driver by historic data |
| 7 | Other Variables | |

The invention described herein can be applicable to a driver that is not a human being. All of the functions and supporting processes (e.g. Drivers app, which is information given to the driver and interaction with the driver with other roles) except driver feedback on, or rating of, the passenger is applicable to a computer, i.e. a self-driving vehicle.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims. In addition, the logic flows descried herein and depicted in the figures do not require the particular order shown, or sequential order, to achieve desirable results, unless otherwise stated.

I claim:

1. A method of dispatching self-driving vehicles for hire comprising:
    providing a system comprising at least one cloud-based server comprising a non-volatile memory;
    logging onto the system by a booker;
    entering passenger information into the non-volatile memory by the booker;
    entering a pickup location and a drop-off location into the system by the booker;
    searching for a vehicle in the system by the booker;
    selecting a vehicle by the booker;
    determining by the system a self-driving vehicle for a passenger;
    a self-driving vehicle connecting to the system;
    entering self-driving vehicle information into a database stored in the non-volatile memory;
    automatically validating self-driving vehicle information by the system, and if the self-driving vehicle's information is validated running a driver app by the self-driving vehicle;
    automatically validating passenger information by the system, and if the passengers information is validated, providing logon information for a passenger app to the passenger;
    running the passenger app by the passenger on a passenger user interface device;
    validating by the system that the passenger app is running on the passenger user interface device;
    inputting an internet protocol (IP) address of the passenger user interface device to the non-volatile memory;
    using the IP address by the system to determine a location of the passenger user interface device;
    validating by the system that the driver app is running by the self-driving vehicle;
    determining by the system at least one route for the self-driving vehicle between the pickup location and drop-off location, and providing the at least one route to the driver app for use by the self-driving vehicle;
    picking up the passenger at the pickup location by the self-driving vehicle;
    determining in real time a real time location of the self-driving vehicle using a global positioning system (GPS) in direct communication with the self-driving vehicle and if the GPS is not on determining in real time the location of the self-driving vehicle using triangulation;
    determining in real time a real time location of the passenger user interface device using the GPS in direct communication with the passenger user interface device and if the GPS is not on determining in real time the location of the passenger user interface device using triangulation;
    determining proximity of the passenger to the self-driving vehicle by the system based on the real time locations of the self-driving vehicle and the passenger user interface device;
    confirming by the system that the self-driving vehicle and passenger are in the same location during a ride based on the real time locations of the self-driving vehicle and the passenger user interface device; and
    confirming by the system that the self-driving vehicle and the passenger are not in same location after the self-driving vehicle leaves the passenger at the drop-off location based on the real time locations of the self-driving vehicle and the passenger user interface device, wherein the method is conducted without the use of a dispatch person communicating directly with the self-driving vehicle or passenger.

2. The method according to claim 1, wherein the booker is an account holder registered with the system.

3. The method according to claim 1, further comprising the system alerting the account holder if a requirement is not met, the requirement being at least one selected from the group of security requirements, ride management permissions, passenger requirements, booker requirements, and account holder requirements.

4. The method according to claim 1, wherein the passenger validation comprising address validation by geo location information.

5. The method according to claim 1, further comprising determining by the system a price for dispatching a vehicle to transport the passenger from the pickup location to the drop-off location, the price based at least one of the price of alternative transportation, time of day, seasonal demand, day of week, passenger ride history, passenger preferences, account preferences, vehicle type, competitor pricing, and local events.

6. The method according to claim 1, wherein the system determines the best self-driving vehicle by weighing at least one of the following factors vehicle type, languages spoken, country of origin, passenger capacity, luggage capacity, vehicle features, profitability, self-driving vehicle ranking based on reviews from passengers, location proximity to passenger, client preference, trip information, passenger preference, company preference, accountholder preference, or booker preference.

7. The method according to claim 1, wherein the system determines the proximity of the passenger to the self-driving vehicle by the self-driving vehicle and passenger user interface device communicating with at least one of each other or the system.

8. The method according to claim 7, wherein self-driving vehicle and the passenger user interface device communicate by an ultra low frequency signal and microphones.

9. The method according to claim 1, wherein if the self-driving vehicle cannot fulfill the ride, the system determines the next best self-driving vehicle.

10. The method according to claim 1, wherein the system determines a fastest route and sends the fastest route to the driver app.

11. The method according to claim 10, wherein the system determines the fastest route based on at least one of weather, construction, traffic accidents, detours, flight delays, and events.

12. The method according to claim 1, wherein the system determines when the self-driving vehicle deviates from the route and alerts the self-driving vehicle of the deviation.

13. The method according to claim 1, wherein the system determines an estimated time of arrival to the pickup location based on self-driving vehicle location and speed limits from the self-driving vehicle location to pickup location, and sends the estimated time of arrival to the passenger app.

14. The method according to claim 1, further comprising the system confirming passenger flight information and adjusting drop-off and/or pickup times based on the passenger flight information.

15. The method according to claim 1, wherein the system changes at least one of pickup time, pickup location, drop-off time, or drop-off location based on at least one of additional stops, delays, passenger requests, environmental, and accidents.

16. The method according to claim 1, further comprising the system sending a settlement to the self-driving vehicle and/or passenger when the self-driving vehicle is at the drop-off location.

17. The method according to claim 1, further comprising the system sending a message to the passenger app to enter a review of the self-driving vehicle.

* * * * *